US011775015B2

(12) United States Patent
Lee et al.

(10) Patent No.: US 11,775,015 B2
(45) Date of Patent: Oct. 3, 2023

(54) ELECTRONIC DEVICE INCLUDING FLEXIBLE PRINTED CIRCUIT BOARD

(71) Applicant: Samsung Electronics Co., Ltd., Suwon-si (KR)

(72) Inventors: Dongyup Lee, Suwon-si (KR); Joon Heo, Suwon-si (KR); Jungchul An, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 249 days.

(21) Appl. No.: 17/376,642

(22) Filed: Jul. 15, 2021

(65) Prior Publication Data

US 2022/0035410 A1 Feb. 3, 2022

Related U.S. Application Data

(63) Continuation of application No. PCT/KR2021/008732, filed on Jul. 8, 2021.

(30) Foreign Application Priority Data

Aug. 3, 2020 (KR) .......................... 10-2020-0096695

(51) Int. Cl.
*G06F 1/16* (2006.01)
*H04B 1/3827* (2015.01)

(52) U.S. Cl.
CPC .......... *G06F 1/1652* (2013.01); *G06F 1/1641* (2013.01); *G06F 1/1681* (2013.01); *H04B 1/3827* (2013.01)

(58) Field of Classification Search
CPC ...... G06F 1/1681; G06F 1/1616; G06F 1/203; G06F 1/1683; G06F 1/1618;
(Continued)

(56) References Cited

U.S. PATENT DOCUMENTS 10,088,879 B2 * 10/2018 Jin .......................... G06F 1/203
10,469,635 B1 * 11/2019 Carlson ................. G06F 1/1683
(Continued)

FOREIGN PATENT DOCUMENTS

CN 105830140 A 8/2016
CN 110445913 A 11/2019
(Continued)

OTHER PUBLICATIONS

Chinese Office Action dated Feb. 23, 2022, issued in Chinese Patent Application No. 202110884905.X.
(Continued)

*Primary Examiner* — Abhishek M Rathod
(74) *Attorney, Agent, or Firm* — Jefferson IP Law, LLP

(57) ABSTRACT

An electronic device is provided. The electronic device includes at least one hinge module providing at least one folding axis, a first housing coupled with the hinge module to rotate around the folding axis, a second housing coupled with the hinge module to rotate around the folding axis, and rotating with respect to the first housing, between a first position at which the second housing is folded, facing the first housing and a second position at which the second housing is unfolded at a specified angle from the first position, a first battery provided in the first housing, a first circuit board including a first arrangement area disposed in parallel to the first battery at least partially along a direction parallel to the folding axis, and a second arrangement area extending from the first arrangement area and disposed between the folding axis and the battery, and at least one flexible printed circuit board (FPCB) extending from the interior of the first housing to the interior of the second housing across the folding axis. Inside the first housing, one end portion of the FPCB is connected to the second arrangement area, between the folding axis and the first battery, and (Continued)

a part of the FPCB is disposed between the first battery and the second arrangement area.

25 Claims, 12 Drawing Sheets

(58) Field of Classification Search
CPC .... G06F 1/1656; G06F 1/1698; G06F 1/1675; G06F 1/16443; G06F 1/1635; G06F 1/1624; G06F 1/206; G06F 1/1652; G06F 1/1641; H05K 5/0017; H05K 5/0226; H05K 5/03; H05K 7/2039; H05K 7/1427; H05K 7/20327; H05K 7/20336
See application file for complete search history.

(56) References Cited

U.S. PATENT DOCUMENTS

| | | | |
|---|---|---|---|
| 2007/0275774 A1* | 11/2007 | Fagrenius | H04M 1/0235 455/575.4 |
| 2010/0147581 A1* | 6/2010 | Mitomi | H04M 1/0274 174/254 |
| 2013/0027886 A1* | 1/2013 | Crooijmans | G06F 1/1624 361/704 |
| 2015/0233162 A1 | 8/2015 | Lee et al. | |
| 2017/0315589 A1* | 11/2017 | Isa | G06F 1/1652 |
| 2017/0364123 A1 | 12/2017 | Seo et al. | |
| 2018/0092253 A1* | 3/2018 | Qiu | G06F 1/1681 |
| 2018/0113493 A1* | 4/2018 | Silvanto | E05D 11/0054 |
| 2018/0324964 A1* | 11/2018 | Yoo | G06F 1/1698 |
| 2019/0317572 A1* | 10/2019 | North | G06F 1/203 |
| 2019/0369668 A1* | 12/2019 | Kim | G06F 1/1681 |
| 2020/0060020 A1* | 2/2020 | Park | G06F 1/1616 |
| 2020/0125138 A1 | 4/2020 | Lim et al. | |
| 2020/0267839 A1* | 8/2020 | Woo | H05K 5/0017 |
| 2020/0356143 A1* | 11/2020 | Oh | G06F 1/203 |
| 2021/0132662 A1* | 5/2021 | Cavallaro | G06F 1/1681 |

FOREIGN PATENT DOCUMENTS

| | | |
|---|---|---|
| EP | 2 975 489 A1 | 1/2016 |
| KR | 10-2010-0017835 A | 2/2010 |
| KR | 10-2018-0122210 A | 11/2018 |
| KR | 10-2020-0021172 A | 2/2020 |
| KR | 10-2020-0024500 A | 3/2020 |
| KR | 10-2020-0048238 A | 5/2020 |
| WO | 2020/050641 A1 | 3/2020 |
| WO | 2021/210839 A1 | 10/2021 |

OTHER PUBLICATIONS

International Search Report dated Oct. 15, 2021, issued in International Patent Application No. PCT/KR2021/008732.
European Search Report dated Jan. 4, 2022, issued in European Patent Application No. 21185530.9.
European Search Report dated Feb. 2, 2023, issued in European Patent Application No. 22213125.2.

* cited by examiner

ELECTRONIC DEVICE INCLUDING FLEXIBLE PRINTED CIRCUIT BOARD

CROSS-REFERENCE TO RELATED APPLICATION(S)

This application is a continuation application, claiming priority under § 365(c), of an International application No. PCT/KR2021/008732, filed on Jul. 8, 2021, which was based on and claimed the benefit of a Korean patent application number 10-2020-0096695 filed on Aug. 3, 2020 in the Korean Intellectual Property Office, the disclosures of which are herein incorporated by reference herein in its entirety.

BACKGROUND

1. Field

The disclosure relates to an electronic device. More particularly, the disclosure relates to an electronic device in which at least a pair of housings are rotatably coupled with each other.

2. Description of the Related Art

Along with the development of electronic, information, and communication technologies, various functions have been integrated into a single portable communication device or electronic device. For example, a smart phone is equipped with the functionality of an audio player, an imaging device, or an electronic notebook as well as communication functionality. More various functions may be implemented in the smart phone by additionally installing applications.

A user may search for, select, and obtain more information by accessing a network, not limited to functions (for example, applications) or information included in a portable communication device or an electronic device. Regarding network access, a direct connection scheme (for example, wired communication) may provide fast and stable communication establishment, but with a utilization area limited to a fixed location or a certain range of space. A wireless communication scheme is not limited much in location and space, and offers a transmission rate and stability almost equal to those of the direct connection method. In the future, the wireless communication scheme is expected to provide faster and more stable communication establishment than the direct access scheme.

As personal or portable communication devices such as smart phones become popular, user demands for portability and use convenience are increasing. For example, a touch screen display may provide a virtual keypad that serves as an output device for outputting visual information and substitutes for a mechanical input device (for example, a button-type input device). Accordingly, portable communication devices or electronic devices are capable of providing the same or more improved usability (for example, a larger screen) in a smaller size. On the other hand, it is expected that the commercialization of flexible displays, for example, foldable or rollable displays will improve the portability and use convenience of electronic devices.

The above information is presented as background information only to assist with an understanding of the disclosure. No determination has been made, and no assertion is made, as to whether any of the above might be applicable as prior art with regard to the disclosure.

In an electronic device having a folded structure, various electronic components may be arranged in different housings and electrically connected to each other through wires such as cables or a flexible printed circuit board (FPCB). A wiring such as a cable or an FPCB may have at least one connector to be connected to another circuit board. The electronic device may perform ultra-high-speed communication or large-capacity data transmission by having low loss and broadband features and/or including more wires. For example, as the performance or communication function of the electronic device is enhanced, more wires may connect electronic components between different housings. However, considering that the internal space of the housings gradually decreases due to the portability of the electronic device, it may be difficult to secure a space in which cables and wires for connecting electronic components may be arranged. As more wires are arranged, the design freedom for arrangement of electrical/electronic components or the capacity of a battery may be limited.

Aspects of the disclosure are to address at least the above-mentioned problems and/or disadvantages and to provide at least the advantages described below. Accordingly, an aspect of the disclosure is to provide an electronic device including a wiring structure (for example, a flexible printed circuit board (FPCB) or a connector that connects the FPCB) which may expand an arrangement area of other electronic components on a circuit board.

Another aspect of the disclosure is to provide an electronic device including a wiring structure which may increase the capacity of a battery in an internal space.

Another aspect of the disclosure is to provide an electronic device including a wiring structure which may contribute to miniaturization or light weight of the electronic device.

Additional aspects will be set forth in part in the description which follows and, in part, will be apparent from the description, or may be learned by practice of the presented embodiments.

TECHNICAL SOLUTION

In accordance with an aspect of the disclosure, an electronic device is provided. The electronic device comprise a first housing, a second housing, a hinge area disposed between the first housing and the second housing, at least one hinge module provided at the hinge area, the at least one hinge module coupled to the first housing and the second housing and configured to allow rotation of the first housing and the second housing with respect to each other between a folded position and a unfolded position, a first battery provided in the first housing, a first circuit board provided in the first housing, the first circuit board includes a first portion disposed between the first battery and the hinge area, and at least one flexible printed circuit board (FPCB) extending from an interior of the first housing to an interior of the second housing, wherein a portion of the at least one FPCB is disposed between the first battery and the first portion of the first circuit board.

In accordance with another aspect of the disclosure, an electronic device is provided. The electronic device includes at least one hinge module providing at least one folding axis, a first housing coupled with the hinge module to rotate around the folding axis, a second housing coupled with the hinge module to rotate around the folding axis, and rotating with respect to the first housing, between a first position at which the second housing is folded, facing the first housing and a second position at which the second housing is unfolded at a specified angle from the first position, a first battery provided in the first housing, a first circuit board including a first arrangement area disposed in parallel to the first battery at least partially along a direction parallel to the folding axis, and a second arrangement area extending from the first arrangement area and disposed between the folding axis and the battery, and at least one flexible printed circuit board (FPCB) extending from the interior of the first housing to the interior of the second housing across the folding axis. Inside the first housing, one end portion of the FPCB is connected to the second arrangement area, between the folding axis and the first battery, and a part of the FPCB is disposed between the first battery and the second arrangement area.

In accordance with another aspect of the disclosure, a portable communication device is provided. The portable communication device includes a housing foldable with respect to a folding axis and including a first housing part, a second housing part, and a hinge cover located between at least a part of the first housing part and at least a part of the second housing part, the first housing part including a first sidewall part extending in parallel to the folding axis, a second sidewall part extending from a first end of the first sidewall part, perpendicularly to the folding axis, and a third sidewall part extending from a second end of the first sidewall part, perpendicularly to the folding axis, a hinge module accommodated in the housing and connected to the first housing part and the second housing part, a flexible display accommodated in the first housing part and the second housing part, a battery accommodated in the first housing part and having a first side surface directed toward the second sidewall part and spaced from the second sidewall part by a first distance and a second side surface directed toward the hinge cover and spaced from the hinge cover by a second distance smaller than the first distance, a first rigid printed circuit board (RPCB) accommodated in the first housing part and including a first part located between the first side surface of the battery and the second sidewall part and a second part extending from the first part and located between the second side surface of the battery and the hinge cover, the second part including a first surface directed toward the flexible display, a second surface directed in a direction opposite to the first surface of the second part, and a first connector located on the second surface of the second part, a second RPCB accommodated in the second housing part and including a third part opposing the second part of the first RPCB in a folded state of the housing, the third part including a first surface directed toward the flexible display, a second surface directed in a direction opposite to the first surface of the third part, and a second connector located on the second surface of the third part, and an FPCB at least partially disposed between the hinge cover and the flexible display and connected to the first connector of the first RPCB and the second connector of the second RPCB. The FPCB extends in a first direction to surround the second surface of the second part of the first RPCB, a side surface between the first surface and the second surface of the second part, and a part of the first surface of the second part, and is connected to the first connector. The FPCB extends in a second direction opposite to the first direction, and is connected to the second connector.

In accordance with another aspect of the disclosure, an electronic device is provided. The electronic device includes at least one hinge module, a first housing coupled with the hinge module to rotate around a first rotation axis, a second housing coupled with the hinge module to rotate around a second rotation axis, and rotating with respect to the first housing, between a first position at which the second housing is folded, facing the first housing and a second position at which the second housing is unfolded at a specified angle from the first position, at least one battery provided in at least one of the first housing or the second housing, and at least one FPCB extending from the interior of the first housing to the interior of the second housing across the first rotation axis or the second rotation axis. At the second position, one end portion of the FPCB is disposed in parallel to the battery along a direction crossing the first rotation axis or the second rotation axis.

In accordance with another aspect of the disclosure, an electronic device is provided. The electronic device includes a first housing rotating around a first rotation axis, a second housing rotating around a second rotation axis and rotating with respect to the first housing, between a first position at which the second housing is folded, facing the first housing and a second position at which the second housing is unfolded at a specified angle from the first position, a hinge module coupling the second housing rotatably with the first housing and providing the first rotation axis and the second rotation axis, at least one battery provided in at least one of the first housing or the second housing, at least one circuit board provided together with the battery in at least one of the first housing or the second housing, and at least one FPCB extending from the interior of the first housing to the interior of the second housing across the first rotation axis or the second rotation axis. The circuit board includes a first arrangement area located in parallel to the battery in a direction parallel to the first rotation axis, and a second arrangement area extending from the first arrangement area along a direction of the first rotation axis and located in parallel to the battery in a direction crossing the first rotation axis. One end portion of the FPCB is connected to the circuit board, in the second arrangement area.

SUMMARY

As is apparent from the foregoing description, according to various embodiments of the disclosure, a wiring for connecting electric/electronic components (for example, circuit boards) accommodated in different housings to each other may be disposed to be connected to the circuit boards at a position substantially parallel to a battery, inside one housing, and may be located in an area between the battery and the other housing. In a structure in which at least a pair of housings are rotatably coupled, this connection position may substantially correspond to an unused space. For example, an area for arranging electronic components (for example, an IC chip or a passive device) may further be secured in another area of the circuit boards by arranging the wiring structure in the unused space. For example, design freedom may be increased in arranging electronic components on a circuit board. In some embodiment, a space for increasing a batter capacity in the inner spaces of the housings may be expanded by miniaturizing the circuit boards without arranging electronic components in the secured extra area. In another embodiment, the electronic device may be miniaturized by miniaturizing the housings without increasing the battery capacity in the expanded space.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
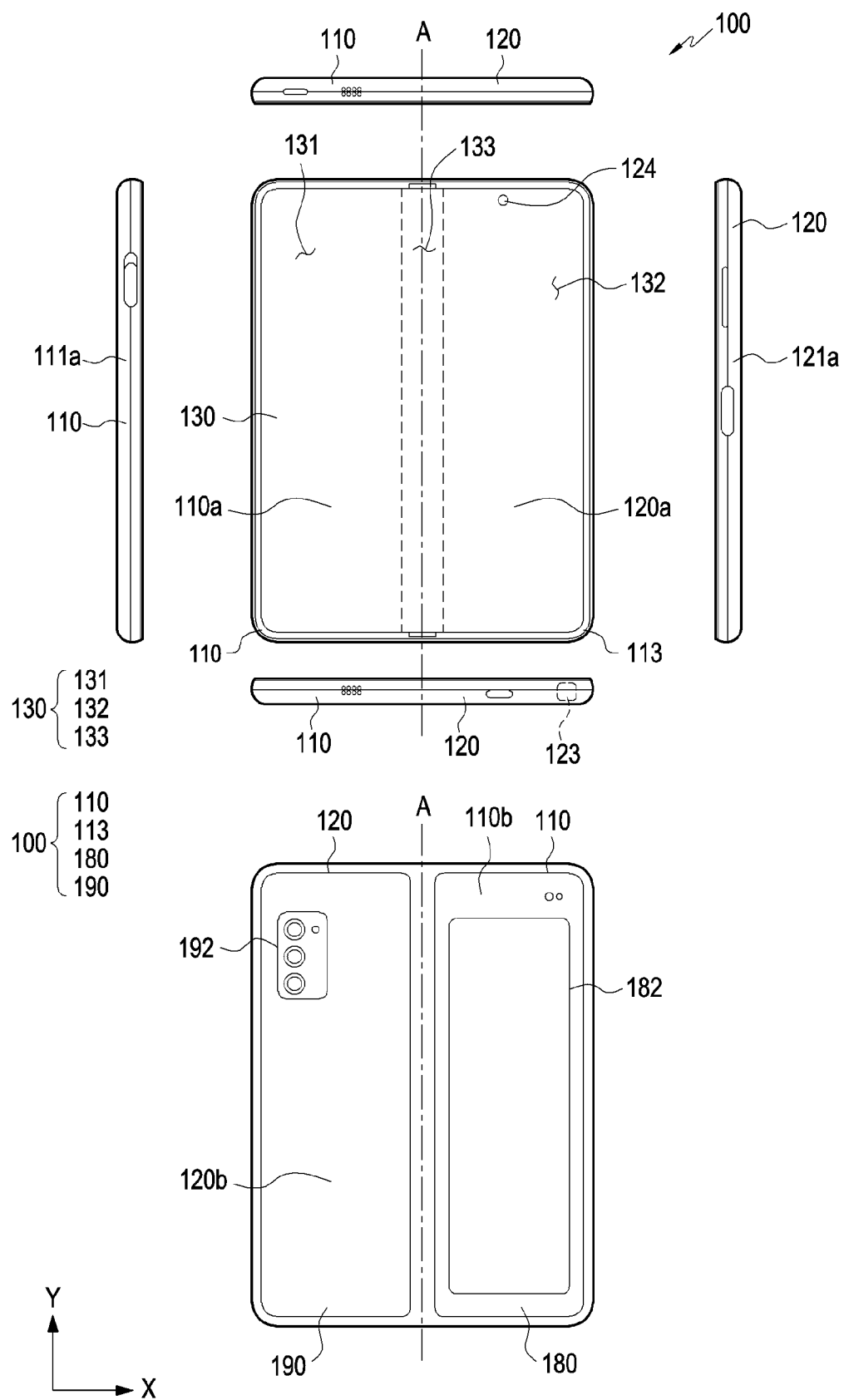
FIG. 1 is a diagram illustrating a flat state of an electronic device according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The electronic device according to various embodiments may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or rearrangements for a corresponding embodiment. With regard to the description of the drawings, similar reference numerals may be used to refer to similar or related elements. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment of the disclosure, the module may be implemented in a form of an application-specific integrated circuit (ASIC).

Various embodiments as set forth herein may be implemented as software (e.g., the program) including one or more instructions that are stored in a storage medium (e.g., internal memory or external memory) that is readable by a machine (e.g., the electronic device). For example, a processor (e.g., the processor) of the machine (e.g., the electronic device) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment of the disclosure, a method according to various embodiments of the disclosure may be included and provided in a computer program product. The computer program products may be traded as commodities between sellers and buyers. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments of the disclosure, each component (e.g., a module or a program) of the above-described components may include a single entity or multiple entities. Some of the plurality of entities may be separately disposed in different components. According to various embodiments of the disclosure, one or more of the above-described components may be omitted, or one or more other components may be added. Alternatively or additionally, a plurality of components (e.g., modules or programs) may be integrated into a single component. In such a case, according to various embodiments of the disclosure, the integrated component may perform one or more functions of each of the plurality of components in the same or similar manner as they are performed by a corresponding one of the plurality of components before the integration. According to various embodiments of the disclosure, operations performed by the module, the program, or another component may be carried out sequentially, in parallel, repeatedly, or heuristically, or one or more of the operations may be executed in a different order or omitted, or one or more other operations may be added.

FIG. 1 is a diagram illustrating a flat state of an electronic device according to an embodiment of the disclosure.

Figure 2:
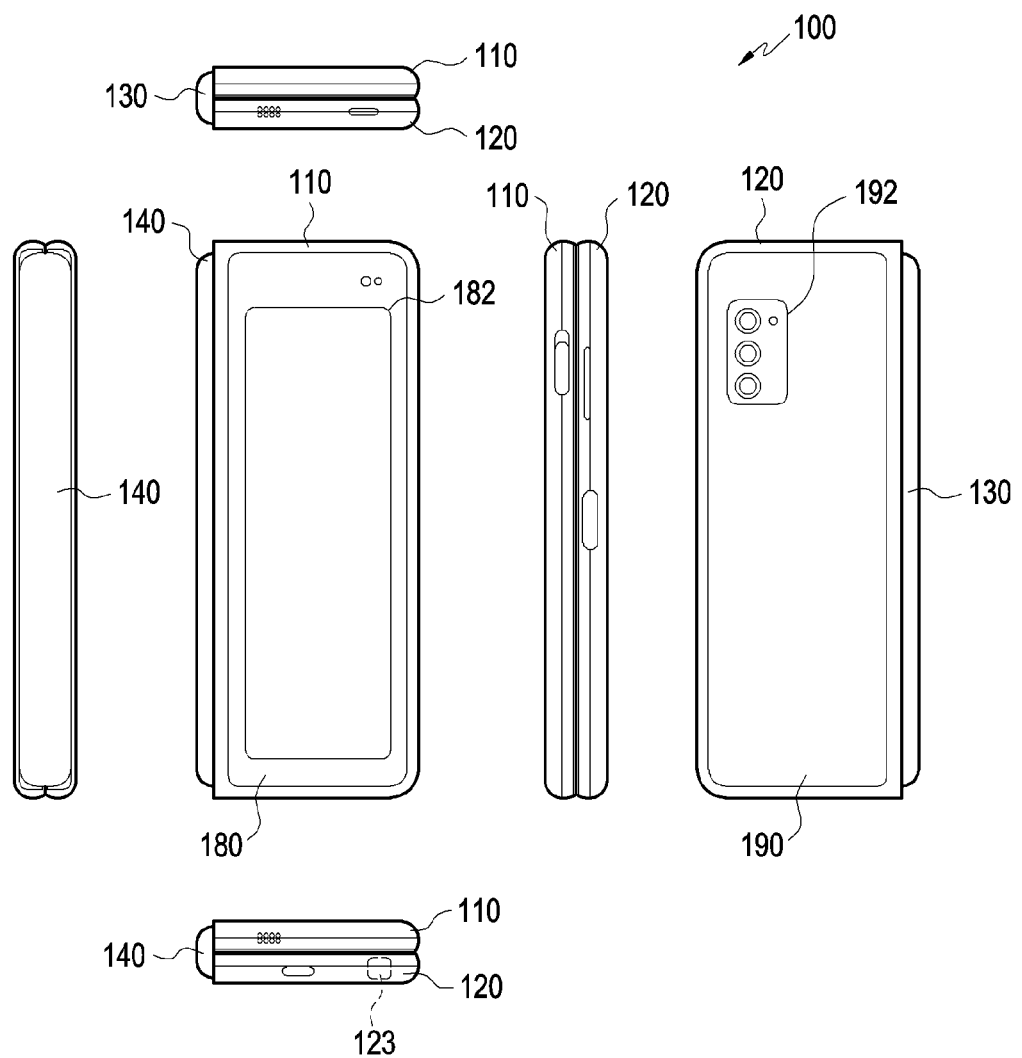
FIG. 2 is a diagram illustrating a folded state of an electronic device according to an embodiment of the disclosure.

FIG. 2 is a diagram illustrating a folded state of an electronic device according to an embodiment of the disclosure.

Figure 3A:
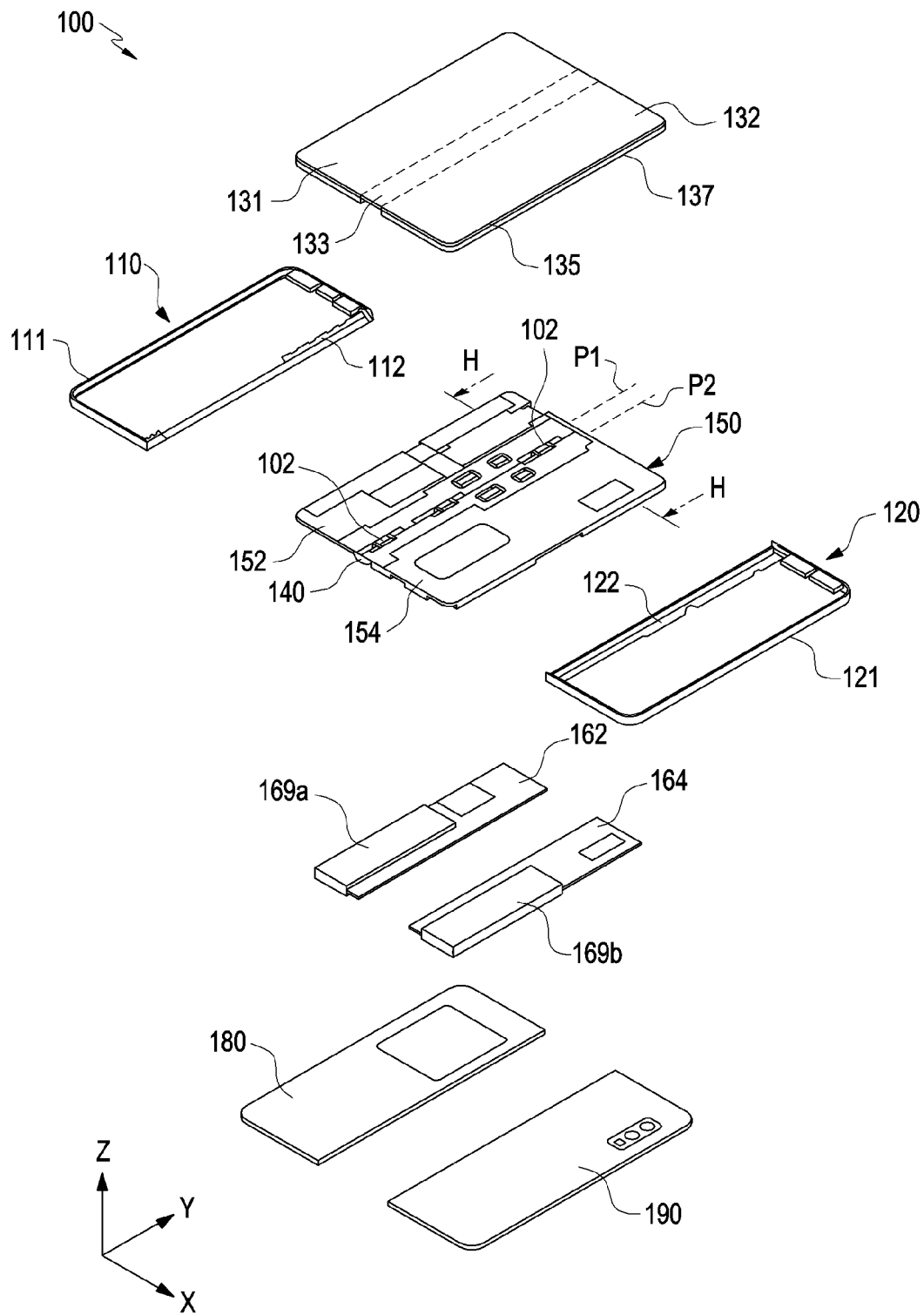
FIG. 3A is an exploded perspective view illustrating an electronic device according to an embodiment of the disclosure.

FIG. 3A is an exploded perspective view illustrating an electronic device according to an embodiment of the disclosure.

In describing various embodiments of the disclosure, a configuration in which a pair of housings (for example, a first housing 110 and a second housing 120) are rotatably coupled with each other by a hinge structure (for example, a hinge module 102 in FIG. 3A) may be taken as an example. However, it is to be noted that this embodiment does not limit an electronic device 100 according to various embodiments of the disclosure. For example, the electronic device 100 according to various embodiments of the disclosure may include three or more housings, and the term "a pair of housings" in an embodiment disclosed below may mean "two housings rotatably coupled with each other among three or more housings".

In the following detailed description, "+X/−X direction", "+Y/−Y direction" or "+Z/−Z direction" may be mentioned, and it is to be noted that a Cartesian coordinate system is generally described below with respect to the width direction X, the length direction Y, or the thickness direction Z of the first housing 110 in FIG. 1 or 2. For example, according to some embodiments or depending on any other structure set as a reference in the electronic device 100, the definitions of the above directions may vary. In the following detailed description, the "front surface (face)" or "rear surface (face)" of the electronic device 100 or each of the housings 110 and 120 may be mentioned. Regardless of the relative positions (e.g., the flat or unfolded state or the folded state) of the housings 110 and 120, a surface on which a flexible display 130 of FIG. 1 is disposed is defined as "the front surface of the electronic device 100 (or the front surfaces of the housings 110 and 120)", and a surface facing in the opposite direction of the surface with the flexible display 130 disposed thereon is defined as "the rear surface of the electronic device 100 (or the rear surfaces of the housings 110 and 120)". According to some embodiments, reference may be made to "a configuration in which the electronic device 100 includes a display" where "display" may refer to a flexible display 130 in FIG. 1 or FIG. 3A.

Referring to FIGS. 1 and 2, in an embodiment, the electronic device 100 may include the pair of housings 110 and 120 rotatably coupled to each other, a hinge cover (for example, a hinge cover 140 in FIG. 3A) that covers foldable parts of the housings 110 and 120, and a foldable display (i.e., the flexible display 130) disposed in a space defined by the housings 110 and 120. According to an embodiment, the surface on which the flexible display 130 is disposed may be defined as a first surface 110a and/or a third surface 120a of the electronic device 100 and/or the housing 110 or 120. In another embodiment, a surface opposite to the first surface 110a and/or the third surface 120a may be defined as a second surface 110b and/or a fourth surface 120b of the electronic device 100 and/or the housing 110 or 120. In another embodiment, a surface surrounding a space between the first surface 110a and the second surface 110b and/or a surface surrounding a space between the third surface 120a and the fourth surface 120b may be defined as a side surface 113 (for example, a first side surface 111a or a second side surface 121a) of the electronic device 100 and/or the housing 110 or 120. The second surface 110b may include a sub-display 182.

According to various embodiments, the first housing 110 and the second housing 120 may be disposed side by side to each other in an unfolded position (i.e., the flat state) and a hinge area (or a hinge space) may be formed between the first housing 110 and the second housing 120 in the unfolded position. In the unfolded position, the hinge area (or the hinge space) may be at least partially disposed in a position corresponding to a folding area 133 of the flexible display 130. For example, the hinge structure or the hinge module 102 may be provided in the hinge area in at least the flat state and rotatably couple the first housing 110 and the second housing 120 to each other. In an embodiment, the hinge area or the hinge space is capable of be deformed in a shape or in a size as the first housing 110 and the second housing 120 rotating with respect to each other.

Figure 4:
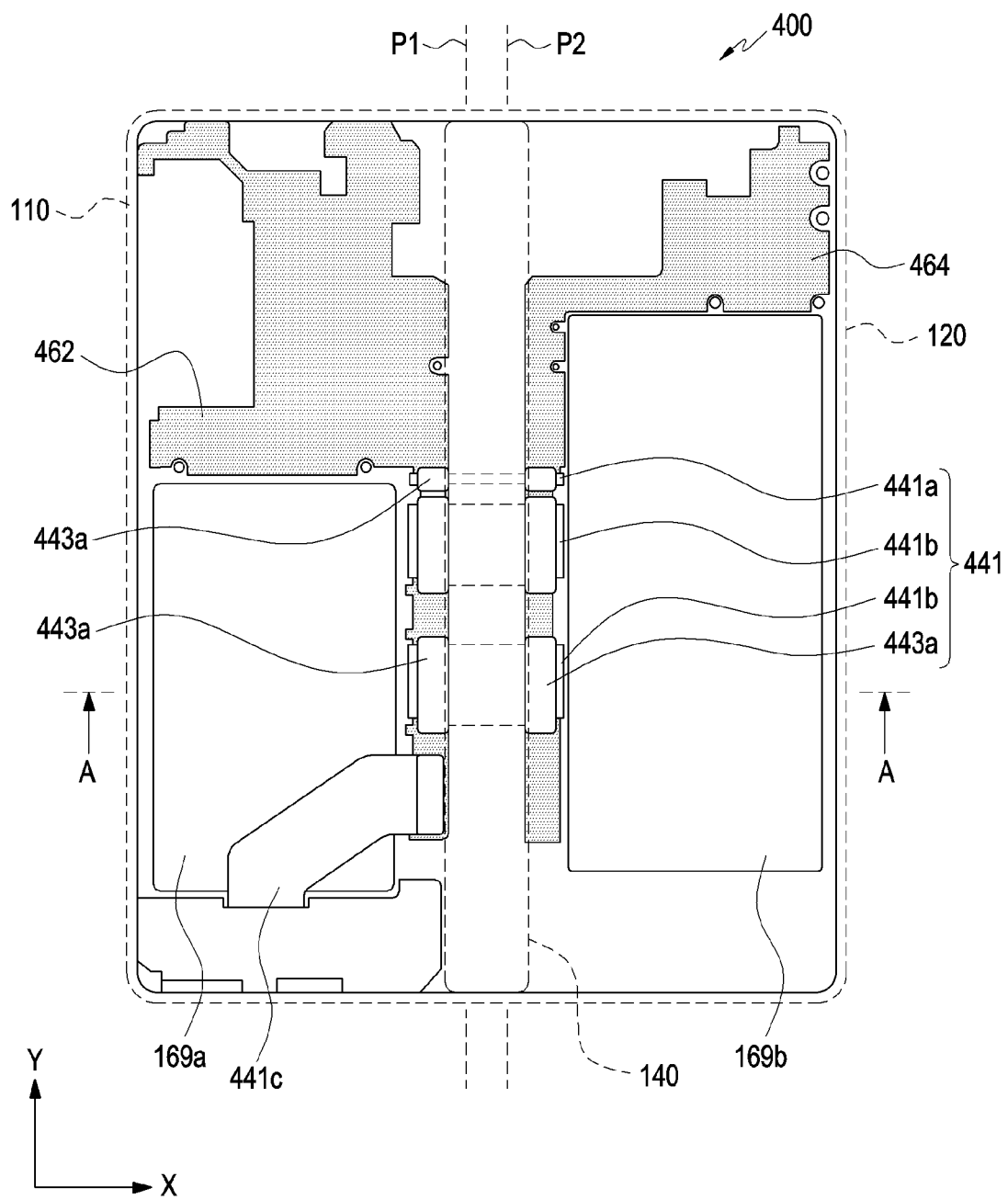
FIG. 4 is a diagram illustrating a wiring structure in an electronic device according to an embodiment of the disclosure.

According to various embodiments, the housings 110 and 120 may include the first housing (or first housing structure) 110, the second housing (or second housing structure) 120 including a sensor area 124, a first rear cover 180, a second rear cover 190, and a hinge structure (for example, the hinge structure or hinge module 102 in FIG. 4). The housings 110 and 120 of the electronic device 100 may be implemented by combining and/or coupling other shapes or components with each other, not limited to the shape or combination illustrated in FIGS. 1 and 2. For example, in another embodiment, the first housing 110 and the first rear cover 180 may be integrally formed, and the second housing 120 and the second rear cover 190 may be integrally formed.

According to various embodiments, the first housing 110 may be coupled with the hinge module 102 to rotate around a first rotation axis (for example, a first rotation axis P1 in FIG. 3A), and include the first surface 110a facing in a first direction (for example, a +Z direction) and the second surface 110b facing in a second direction (e.g., a −Z direction) opposite to the first direction. The second housing 110 may be coupled with the hinge module 102 to rotate around a second rotation axis (for example, a second rotation axis P2 in FIG. 3A), and include the third surface 130a facing in a third direction and a fourth surface 130b facing in a fourth direction opposite to the third direction. The second housing 120 may rotate with respect to the first housing 110 upon the hinge module 102. The third direction may be a Z-axis direction. The third direction may be defined as the +Z direction or the −Z direction according to the flat state or the folded state. For example, the electronic device 100 may be changed to the folded state or the flat state. In one embodiment, the distance between the first and second rotation axes P1 and P2 may vary depending on the design of the hinge module 102. In some embodiments, the first rotation axis P1 and the second rotation axis P2 are formed substantially in parallel, whereas in other embodiments, the first rotation axis P1 and the second rotation axis P2 may coincide with each other, forming a folding axis A of FIG. 1. The configuration of the hinge structure or the hinge module 102 will further be described with reference to FIG. 3B.

Figure 3B:
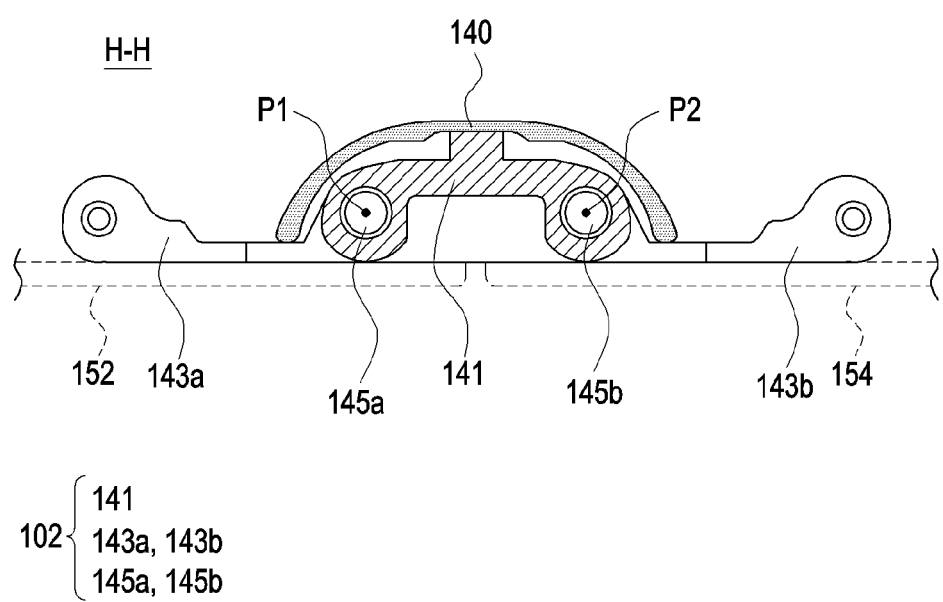
FIG. 3B is a sectional view illustrating a hinge structure or a hinge module in an electronic device according to an embodiment of the disclosure.

FIG. 3B is a sectional view illustrating a hinge structure or hinge module of an electronic device (for example, the electronic device 100 in FIGS. 1, 2 and 3A) according to an embodiment of the disclosure.

Referring to FIG. 3B, the hinge structure or hinge module 102 may include a hinge bracket 141, hinge arms 143a and 143b, and/or rotation pins 145a and 145b. In one embodiment, a plurality of (for example, a pair of) hinge structures or hinge modules 102 may be disposed apart from each other in the electronic device 100. For example, a pair of hinge modules 102 may be arranged at a predetermined interval along a Y-axis direction. In one embodiment, a wiring (for example, a flexible printed circuit board (FPCB) 441 in FIG. 10) that electrically couples an internal component of the first housing 110 to an internal component of the second housing 120 may be disposed in the gap or space between the pair of hinge modules 102, crossing the first rotation axis P1 and/or the second rotation axis P2.

According to various embodiments, the hinge bracket 141 may be accommodated substantially in the hinge cover 140 and fixed to the inner surface of the hinge cover 140. In an embodiment, a first hinge arm 143a of the hinge arms 143a and 143b may be disposed on or fixed to a first mid plate 152 and rotatably coupled with the hinge bracket 141. For example, a first rotation pin 145a of the rotation pins 145a and 145b may rotatably couple the first hinge arm 143a with the hinge bracket 141. In another embodiment, a second hinge arm 143b of the hinge arms 143a and 143b may be disposed on or fixed to a second mid plate 154 and rotatably coupled with the hinge bracket 141. For example, a second rotation pin 145b of the rotation pins 145a and 145b may rotatably couple the second hinge arm 143a with the hinge bracket 141.

According to various embodiments, the first rotation axis P1 and the second rotation axis P2 may be defined substantially by the rotation pins 145a and 145b. For example, the rotation pins 145a and 145b may be rotatably disposed on the hinge bracket 141, in parallel to a Y axis. In some embodiments, the rotation pins 145a and 145b may be fixed to the hinge bracket 141, and the hinge arms 143a and 143b may be rotatably coupled with the rotation pins 145a and 145b. According to an embodiment, the distance between the first and second rotation axes P1 and P2 may be set according to the distance between the rotation pins 145a and 145b on the hinge bracket 141.

According to various embodiments, the first surface 110a may face the third surface 120a in the folded state of the electronic device 100, and the third direction may be identical to the first direction in the flat state of the electronic device 100. For example, the first housing 110 and the second housing 120 may rotate with respect to each other between a first position at which the first and second housings 110 and 120 are folded to face each other and a second position at which the first and second housings 110 and 120 are unfolded at a specified angle (for example, 180 degrees) from the first position. According to an embodiment, the first and third directions may be the +Z direction, and the second and fourth directions may be the −Z direction in the flat state of the electronic device 100. According to an embodiment, the first and fourth directions may be the +Z direction, and the second and third directions may be the −Z direction in the folded state of the electronic device 100. Unless otherwise mentioned, directions will be described below based on the flat state of the electronic device 100.

According to various embodiments, the first housing 110 and the second housing 120 may be disposed on both sides of the folding axis A and may be symmetrical with respect to the folding axis A on the whole. As described later, the angle or distance between the first housing 110 and the second housing 120 may be different depending on whether the electronic device 100 is in the flat state, the folded state, or an intermediate state. According to an embodiment, the second housing 120 is different from the first housing 110 in that the second housing 120 additionally includes the sensor area 124 in which various sensors are arranged. However, the first and second housings 110 and 120 may be symmetrical with each other in the remaining area except for the sensor area 124.

According to various embodiments, the electronic device 100 may include a structure into which a digital pen (for example, a stylus pen) is inserted. For example, a hole 123 into which the digital pen may be inserted may be formed into a side surface of the first housing 110 or the second housing 120 of the electronic device 100. Since the digital pen may be inserted into the hole 123, a user may be relieved of the inconvenience of carrying the digital pen.

According to various embodiments, the first housing 110 and the second housing 120 may form a recess for accommodating the flexible display 130, as illustrated in FIG. 1. According to an embodiment, the flexible display 130 may be partially asymmetric in shape due to the sensor area 124.

According to various embodiments, at least a part of the first housing 110 and the second housing 120 may be formed of a metal or non-metal having a rigidity selected to support the flexible display 130. The at least metal part may provide a ground plane for the electronic device 100, and may be electrically coupled to a ground line formed on a printed circuit board (PCB) (for example, circuit boards 162 and 164 in FIG. 3A).

According to various embodiments, the sensor area 124 may be formed to have a predetermined area adjacent to one corner of the second housing 120. However, the arrangement, shape, and size of the sensor area 124 are not limited to the illustrated example. For example, in another embodiment, the sensor area 124 may be provided at another corner of the second housing 120 or in any area between upper and lower corners of the second housing 120. In an embodiment, components for performing various functions embedded in the electronic device 100 may be exposed from the front surface of the electronic device 100 through the sensor area 124 or through one or more openings provided in the sensor area 124. In various embodiments, the components may include various types of sensors. The sensors may include, for example, at least one of a front camera, a receiver, an illuminance sensor, or a proximity sensor.

According to various embodiments, the first rear cover 180 may be disposed on the rear surface of the electronic device 100 (for example, the first housing 110) on one side of the folding axis A. The first rear cover 180 may have, for example, a substantially rectangular periphery which may be surrounded by the first housing 110. Similarly, the second rear cover 190 may be disposed on the rear surface of the electronic device 100 (for example, the second housing 120) on the other side of the folding shaft A, with its periphery surrounded by the second housing 120.

According to various embodiments, the first rear cover 180 and the second rear cover 190 may be substantially symmetrical with respect to the folding axis A. However, the first rear cover 180 and the second rear cover 190 are not necessarily symmetrical to each other, and in another embodiment, the electronic device 100 may include the first rear cover 180 and the second rear cover 190 in various shapes. In another embodiment, the first rear cover 180 may be integrally formed with the first housing 110, and the second rear cover 190 may be integrally formed with the second housing 120.

According to various embodiments, the first rear cover 180, the second rear cover 190, the first housing 110, and the second housing 120 may form a space in which various components (for example, a PCB or a battery) of the electronic device 100 may be arranged. According to an embodiment, one or more components may be arranged or visually exposed on the rear surface of the electronic device 100. For example, the electronic device 100 may include a sub-display which is at least partially exposed from a first rear area of the first rear cover 180. In another embodiment, one or more components or sensors may be visually exposed from a second rear area 192 of the second rear cover 190. In various embodiments, sensors exposed from the second rear area 192 may include a proximity sensor and/or a rear camera.

According to various embodiments, the front camera exposed from the front surface of the electronic device 100 through one or more openings formed in the sensor area 124 or the rear camera exposed from the second rear area 192 of the second rear cover 190 may include one or more lenses, an image sensor, and/or an image signal processor. In some embodiments, a flash including, for example, a light emitting diode (LED) or a xenon lamp may be disposed in the second rear area 192. In some embodiments, two or more lenses (an infrared camera, a wide-angle lens, and a telephoto lens) and image sensors may be disposed on one surface of the electronic device 100.

Referring to FIG. 2, the hinge cover 140 may be disposed between the first housing 110 and the second housing 120 and configured to accommodate and cover an internal component (for example, the hinge structure or hinge module 102 in FIG. 3A). According to an embodiment, the hinge cover 140 may be covered by parts of the first housing 110 and the second housing 120 or exposed outward, depending on the state (flat or folded state) of the electronic device 100. In one embodiment, at the first position, for example, in the folded state illustrated in FIG. 2, the first housing 110 and the second housing 120 may be substantially folded to face each other, and the hinge cover 140 may be visually exposed outward. In another embodiment, at the second position, for example, in the flat state illustrated in FIG. 1, the first housing 110 and the second housing 120 may be unfolded at an angle of 180 degrees from the first position, and the hinge cover 140 may be substantially hidden by the first housing 110 and the second housing 120. In another example, in the intermediate state in which the first housing 110 and the second housing 120 are folded at a certain angle, the hinge cover 140 may be partially exposed outward between the first housing 110 and the second housing 120. In this case, however, the exposed area may be smaller than in the fully folded state. In one embodiment, the hinge cover 140 may include a curved surface.

According to various embodiments, the flexible display 130 may be disposed in the space formed by the housings 110 and 120. For example, the flexible display 130 may be mounted in the recess formed by the housings 110 and 120 and form most of the front surface of the electronic device 100. Accordingly, the front surface of the electronic device 100 may include the flexible display 130, a partial area of the first housing 110 adjacent to the flexible display 130, and a partial area of the second housing 120 adjacent to the flexible display 130. Further, the rear surface of the electronic device 100 may include the first rear cover 180, a partial area of the first housing 110 adjacent to the first rear cover 180, the second rear cover 190, and a partial area of the second housing 120 adjacent to the second rear cover 190.

According to various embodiments, the flexible display 130 may refer to a flexible display which may be at least partially transformed into a flat surface or a curved surface. According to an embodiment, the flexible display 130 may include the folding area 133, a first area 131 disposed on one side of the folding area 133 (for example, to the left of the folding area 133 in FIG. 1), and a second area 132 disposed on the other side of the folding area 133 (for example, to the right of the folding area 133 in FIG. 1).

However, the area division of the flexible display 130 illustrated in FIG. 1 is exemplary, and the flexible display 130 may be divided into a plurality (for example, four or more, or two) areas according to its structure or function. For example, while the area of the flexible display 130 may be divided by the folding area 133 extending in parallel to the Y axis or the folding axis A in the embodiment illustrated in FIG. 1, the area of the flexible display 130 may be divided based on another folding area (for example, a folding area parallel to an X axis) or another folding axis (for example, a folding axis parallel to the X axis) in another embodiment. According to an embodiment, the flexible display 130 may be combined with or disposed adjacent to a touch sensing circuit, a pressure sensor for measuring the intensity (pressure) of a touch, and/or a digitizer configured to detect a magnetic field-type stylus pen.

According to various embodiments, the first area 131 and the second area 132 may be symmetrical with respect to the folding area 133 on the whole. However, unlike the first area 131, the second area 132 may include a cut notch or a transparent area according to the presence of the sensor area 124, and may be symmetrical with the first area 131 in the remaining area. In other words, the first area 131 and the second area 132 may be symmetrical in one part and asymmetrical in the other part.

Now, a description will be given of operations of the first housing 110 and the second housing 120 and each area of the flexible display 130 according to the state (for example, flat or folded state) of the electronic device 100.

According to various embodiments, when the electronic device 100 is in the flat state (for example, FIG. 1), the first housing 110 and the second housing 120 may be at a specified angle, for example, 180 degrees, with the first area 131 and the second area 132 of the flexible display 130 facing in the same direction. For example, the surface of the first area 131 and the surface of the second area 132 are at 180 degrees with respect to each other, facing in the same direction (for example, the front direction of the electronic device 100). The folding area 133 may be on the same plane with the first area 131 and the second area 132.

According to various embodiments, when the electronic device 100 is in the folded state (for example, FIG. 2), the first housing 110 and the second housing 120 may face each other. The surface of the first area 131 may face the surface of the second area 132 at a narrow angle (for example, between 0 and 10 degrees). At least a part of the folding area 133 may be a curved surface with a specific curvature.

According to various embodiments, when the electronic device 100 is in the intermediate state, the first housing 110 and the second housing 120 may be at a certain angle, for example, at any of the angles between the first position of FIG. 2 and the second position of FIG. 1. The surface of the first area 131 and the surface of the second area 132 in the flexible display 130 may be at an angle larger than in the folded state and smaller than in the flat state. At least a part of the folding area 133 may be a curved surface with a specific curvature which may be smaller than in the folded state.

Referring to FIG. 3A, the electronic device 100 may include the housings 110 and 120, the flexible display 130, and the circuit boards 162 and 164. The housings 110 and 120 may include the first housing 110, the second housing 120, a bracket assembly 150, the first rear cover 180, the second rear cover 190, and the hinge module 102.

According to various embodiments, the flexible display 130 may include a display panel 135 and at least one support plate 137 on which the display panel 135 is mounted. The support plate 137 may be disposed between the display panel 135 and the bracket assembly 150.

According to various embodiments, the bracket assembly 150 may include the first mid plate 152 and the second mid plate 154. The hinge structure or hinge module 102 may be disposed between the first mid plate 152 and the second mid plate 154. When viewed from the outside, the hinge module 102 may be covered by the hinge cover (for example, the hinge cover 140 in FIG. 2). According to an embodiment, wirings (for example, FPCBs in FIG. 4 or FIG. 10) 441 may be arranged on the bracket assembly 150, across the first mid plate 152 and the second mid plate 154.

According to various embodiments, the circuit boards 162 and 164 may include a first circuit board 162 disposed on the first mid plate 152 and a second circuit board 164 disposed on the second mid plate 154. The first circuit board 162 and the second circuit board 164 may be disposed inside a space formed by the bracket assembly 150, the first housing 110, the second housing 120, the first rear cover 180, and the second rear cover 190. Electric/electronic components for implementing various functions of the electronic device 100 may be mounted on the first circuit board 162 and the second circuit board 164. In some embodiments, each of the first circuit board 162 and the second circuit board 164 may be interpreted as one of electric/electronic components.

According to various embodiments, with the flexible display 130 coupled with the bracket assembly 159, the first housing 110 and the second housing 120 may be assembled to be coupled with both sides of the bracket assembly 150. For example, the first housing 110 may include a first side member 111 surrounding at least a part of a side surface of the first mid plate 152, and the second housing 120 may include a second side member 121 surrounding at least a part of a side surface of the second mid plate 154. The first housing 110 may include a first rotation support surface 112, and the second housing 120 may include a second rotation support surface 122 corresponding to the first rotation support surface 112. The first rotation support surface 112 and the second rotation support surface 122 may include curved surfaces corresponding to curved surfaces included in the hinge cover 140. According to an embodiment, the first side member 111 may include the first side surface 111a which at least partially surrounds the space between the first surface 110a and the second surface 110b and is perpendicular to the first direction or the second direction. According to an embodiment, the second side member 121 may include the second side surface 121a which at least partially surrounds the space between the third surface 120a and the fourth surface 120b, and is perpendicular to the third direction or the fourth direction.

According to an embodiment, when the electronic device 100 is in the flat state (for example, the electronic device in FIG. 1), the first rotation support surface 112 and the second rotation support surface 122 may hide the hinge cover 140 so that the hinge cover 140 may not be exposed or may be exposed to a minimum extent from the rear surface of the electronic device 100. In another example, when the electronic device 100 is in the folded state (for example, the electronic device in FIG. 2), the hinge cover 140 may be exposed fully outward from the electronic device 100.

According to various embodiments, the electronic device 100 may include one or more batteries 169a and 169b. For example, the electronic device 100 may include the batteries 169a and 169b disposed in one of the housings 110 and 120 or disposed respectively in the two housings 110 and 120. The batteries 169a and 169b may be disposed substantially adjacent to the circuit boards 162 and 164 and supply power to at least one component of the electronic device 100. According to an embodiment, each of the batteries 169a and 169b may include, for example, a non-rechargeable primary cell, a rechargeable secondary cell, or a fuel cell.

FIG. 4 is a diagram illustrating a wiring structure of an electronic device (for example, the electronic device 100 of FIGS. 1, 2 and 3A) according to an embodiment of the disclosure.

Referring to FIG. 4, an electronic device 400 includes at least one FPCB 441 (for example, a first FPCB 441a and second PCB(s) 441b) disposed to cross at least one of the rotation axis P1 or the rotation axis P2. For example, the FPCB 441 may extend from the inner space of the first housing 110 to the inner space of the second housing 120 through the space formed by a hinge cover 140 (for example, the hinge cover 140 of FIG. 2 or FIG. 3A). In some embodiments, the electronic device 400 may include another FPCB (for example, a third FPCB 441c) coupling electronic components to each other in one housing (for example, the first housing 110). For example, the third FPCB 441c may connect the first circuit board 162 to a charging terminal or an earphone jack (not shown) inside the first housing 110.

According to various embodiments, the first FPCB 441a may transmit an analog signal for wireless communication. In some embodiments, the second FPCB(s) 441b may provide a circuit pattern for a mobile industry processor interface (MIPI) signal, a camera (CAM) MIPI signal, a peripheral component interconnect express (PCIe) signal, various clock signals, an integrated circuit (IC) control signal, system power, input/output (I/O) unit power, subscriber identity module (SIM) power, and/or a battery. Depending on the number of second FPCB(s) 441b, one second FPCB 441b may include signal line(s) for transmitting a selected part of the above signals or power. In another embodiment, one second FPCB 441b may include signal line(s) for transmitting or transferring all of the above signals or power. In another embodiment, the third FPCB 441c may provide a circuit pattern for a universal serial bus (USB) 2.0 signal, a USB 3.0 signal, various clock signals, a charging line, and/or an IC control signal. In some embodiments, the third FPCB 441c may electrically couple a connector for connecting an external electronic device to the circuit board(s) 162 and 164.

According to various embodiments, at the second position, for example, in the flat state of the housings 110 and 120, one end portion of the FPCB 441 may be located between one of the batteries 169a and 169b and the rotation axes P1 and P2, on the plan view. For example, with the first battery 169a disposed in the first housing 110, one end portion of the FPCB 441 may be disposed between the first battery 169a and the first rotation axis P1 within the first housing 110, when the electronic device 400 is unfolded. For example, a part of a first circuit board 462 (for example, the first circuit board 162 of FIG. 3A) accommodated in the first housing 110 may be located in parallel on one side of the first battery 169a and provide an area to which the FPCB 441 is connected. In another embodiment, with the second battery 169b disposed in the second housing 120, the other end portion of the FPCB 441 may be disposed between the second battery 169b and the second rotation axis P2 within the second housing 120, when the electronic device 400 is unfolded. For example, a part of a second circuit board 464 (for example, the second circuit board 164 of FIG. 3A) accommodated in the second housing 120 may be located in parallel on one side of the second battery 169b and provide an area to which the FPCB 441 is connected.

According to various embodiments, the first circuit board 462 may be, for example, a main circuit board of the electronic device 400, and include various electric/electronic components (for example, an IC chip) including electric circuits such as a processor, a communication module, and a power management module. The configuration of the first circuit board 462 will be described with reference to FIGS. 5 and 6.

Figure 5:
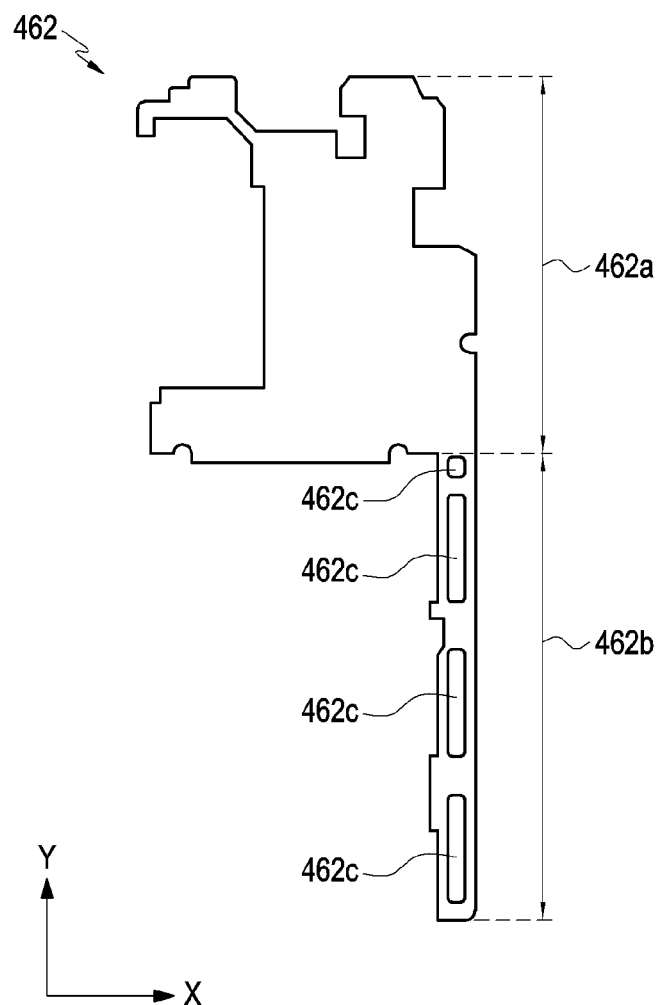
FIG. 5 is a first plan view illustrating a first circuit board in an electronic device according to an embodiment of the disclosure.

FIG. 5 is a first plan view illustrating a first circuit board of an electronic device (for example, the electronic device 100 of FIGS. 1, 2 and 3A) according to an embodiment of the disclosure.

Figure 6:
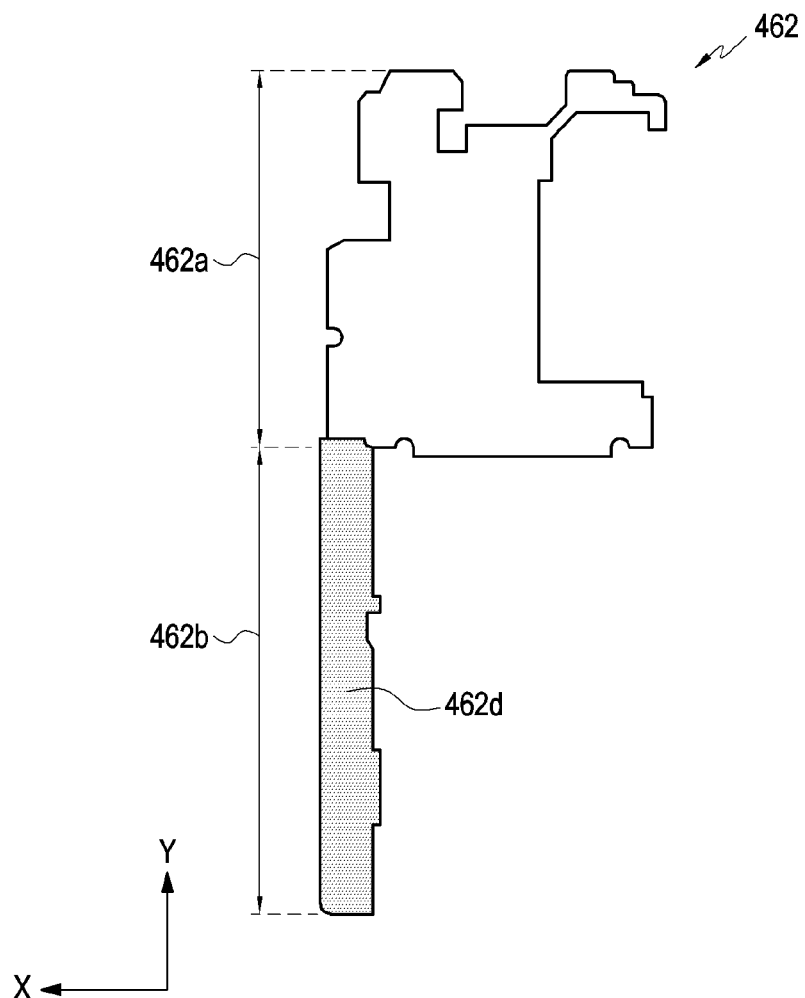
FIG. 6 is a second plan view illustrating a first circuit board in an electronic device according to an embodiment of the disclosure.

FIG. 6 is a second plan view illustrating a first circuit board of an electronic device according to an embodiment of the disclosure.

Referring to FIGS. 5 and 6, the first circuit board 462 may include a first arrangement area 462a and a second arrangement area 462b. The first arrangement area 462a, which is an area in which electrical/electronic components such as the processor or the communication module are mounted, may reside in parallel to the battery 169a, along a length direction (the Y-axis direction) and/or a direction parallel to the rotation axes P1 and P2. The second arrangement area 462b may extend from one edge of the first arrangement area 462a, in parallel to the first battery 169a along a width direction (the X-axis direction) (and/or a direction intersecting the rotation axes P1 and P2). For example, the second arrangement area 462b may extend from the first arrangement area 462a in the length direction (the Y-axis direction), and may be disposed adjacent to the first battery 169a. In one embodiment, the first arrangement area 462a and the second arrangement area 462b may be disposed in correspondence with two side surfaces of the first battery 169a, on the plan view.

According to various embodiments, the second arrangement area 462b may be positioned at one of both edges of the first housing 110 in the width direction (the X-axis direction), thus providing an environment in which the capacity (for example, volume) of the battery 169a may be sufficiently secured. In some embodiments, the second arrangement area 462b may be disposed in the inner space of the first housing 110, between a rotation support surface (for example, the first rotation support surface 112 in FIG. 3A) and the first battery 169a. For example, as the second arrangement area 462b is disposed at a position substantially adjacent to the first rotation support surface 112, the second arrangement area 462b may provide an environment in which the capacity of the first battery 169a may be secured.

According to various embodiments, the second circuit board 464, which is, for example, an auxiliary circuit board of the electronic device 400, may include other electric/electronic components (for example, an IC chip) with electric circuits mounted thereon. The configuration of the second circuit board 464 will be described with reference to FIGS. 7 and 8.

Figure 7:
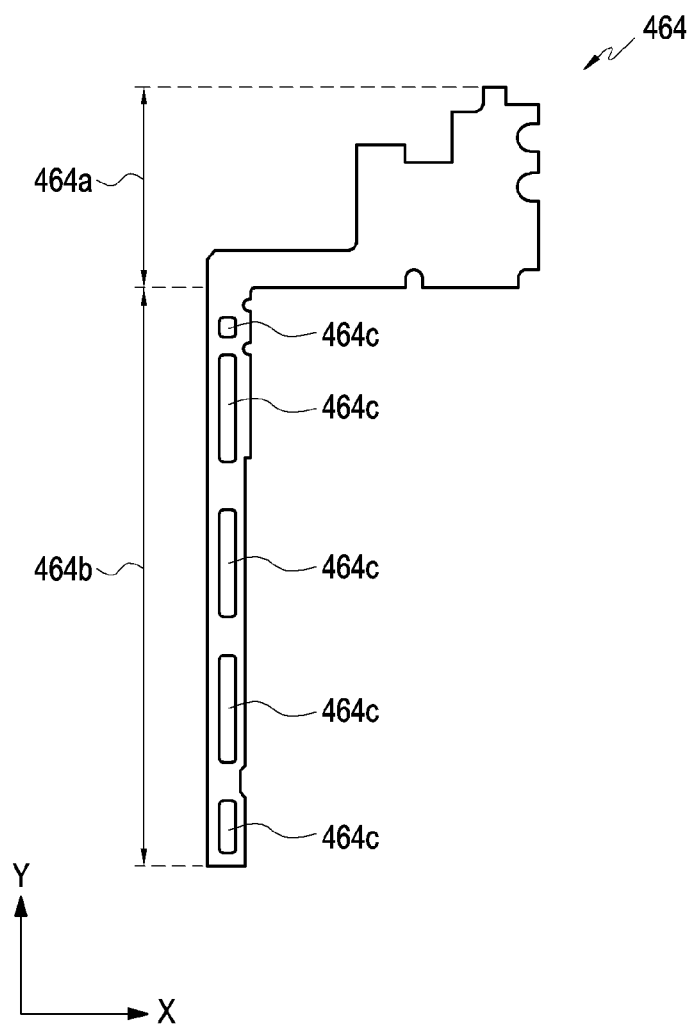
FIG. 7 is a first plan view illustrating a second circuit board in an electronic device according to an embodiment of the disclosure.

FIG. 7 is a first plan view illustrating a second circuit board of an electronic device (for example, the electronic device 100 of FIGS. 1, 2 and 3A) according to an embodiment of the disclosure.

Figure 8:
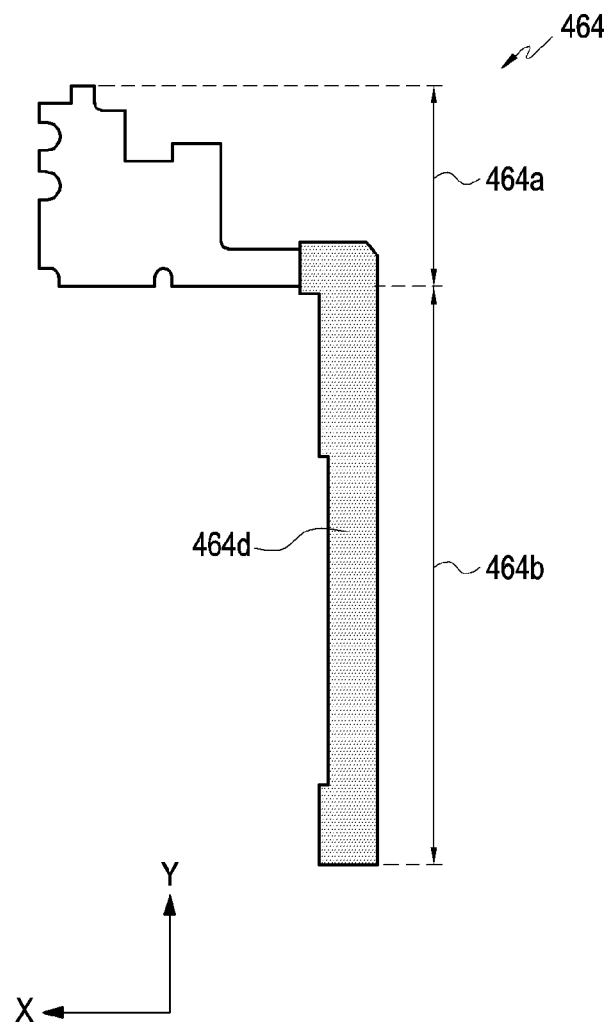
FIG. 8 is a second plan view illustrating a second circuit board in an electronic device according to an embodiment of the disclosure.

FIG. 8 is a second plan view illustrating a second circuit board of an electronic device according to an embodiment of the disclosure.

Referring to FIGS. 7 and 8, the second circuit board 464 may include a third arrangement area 464a and a fourth arrangement area 464b. The third arrangement area 464a, which is an area in which electrical/electronic components such as the processor or the communication module are mounted, may reside in parallel to the second battery 169b along the length direction (the Y-axis direction) and/or the direction parallel to the rotation axes P1 and P2. The fourth arrangement area 464b may extend from one edge of the third arrangement area 464a, in parallel to the second battery 169b along the width direction (the X-axis direction) (and/or the direction intersecting the rotation axes P1 and P2). For example, the fourth arrangement area 464b may extend from the third arrangement area 464a in the length direction (the Y-axis direction), and may be disposed adjacent to the second battery 169b. In one embodiment, the third arrangement area 464a and the fourth arrangement area 464b may be disposed in correspondence with two side surfaces of the second battery 169b, on the plan view.

According to various embodiments, the fourth arrangement area 464b may be positioned at one of both edges of the second housing 120 in the width direction (the X-axis direction), thus providing an environment in which the capacity (for example, volume) of the second battery 169b may be sufficiently secured. In some embodiments, the fourth arrangement area 464b may be disposed in the inner space of the second housing 120, between a rotation support surface (for example, the second rotation support surface 122 in FIG. 3A) and the second battery 169b. For example, as the fourth arrangement area 464b is disposed at a position substantially adjacent to the second rotation support surface 122, the fourth arrangement area 464b may provide an environment in which the capacity of the second battery 169b may be secured.

While the third arrangement area 464a and the fourth arrangement area 464b of the second circuit board 464 are described separately from the configuration of the first circuit board 462 in the above-described embodiment, the third arrangement area 464a may be substantially similar to the first arrangement area 462a, and the fourth arrangement area 464b may be substantially similar to the second arrangement area 462b. In the following detailed description, the configuration of the first arrangement area 462a and its detailed description may be understood as the configuration and detailed description of the third arrangement area 464a, and the configuration of the second arrangement area 462b and its detailed description may be understood as the configuration of the fourth arrangement area 464b and its detailed description.

According to various embodiments, the electronic device 400 and/or the first circuit board 462 and the second circuit board 464 may further include connectors 462c and 464c arranged in the second arrangement area 462b and the fourth arrangement area 464b. The connectors 462c and 464c may be different in size or shape depending on the number of signal lines connected to each of the connectors 462c and 464c or the type of a signal allocated to each of the connectors 462c and 464c. The connectors 462c and 464c may generally extend in one direction, and may be arranged along the length direction (Y-axis direction) and/or the direction in which the rotation axes P1 and P2 extend. One end portion of the FPCB 441 may be formed as a connector portion (for example, a connector portion 443a of FIG. 10) corresponding to any one of the connectors 462c and 464c. For example, one end portion of the FPCB 441 may be connected to the first circuit board 462 (or the second circuit board 464) through one of the connectors 462c (or 464c) in the second arrangement area 462b (or the fourth arrangement area 464b).

According to various embodiments, the circuit boards 462 and 464, for example, at least the second arrangement area 462b and/or the fourth arrangement area 464b may include signal lines through which digital signals such as various control signals, data signals, and system power are transmitted. In some embodiments, the circuit boards 462 and 464 may include 12 conductor layers (for example, signal lines), and an insulating layer and/or a dielectric layer may be provided between the conductor layers. In some embodiments, a reinforcing plate (for example, a reinforcing plate 462d or 464d in FIG. 6 or FIG. 8) to be described later may be provided as one of the conductive layers in the second arrangement area 462b and/or the fourth arrangement area 464b. An example of transmission signals allocated to the conductor layers is illustrated in Table 1 below.

TABLE 1

| Layer | Allocated signals | Note |
|---|---|---|
| 1 | Connector | others, IC chip, passive element |
| 2 | System power<br>Digital acoustic signal<br>IC control signal<br>I/O unit power | |
| 3 | System power<br>IC control signal<br>I/O unit power | |
| 4 | Ground<br>System power<br>Battery | |
| 5 | PCIe<br>USB 2.0<br>Clock signal<br>System power<br>Battery | High-speed/large-capacity signal transmission<br>High frequency signal transmission for wireless communication |

TABLE 1-continued

| Layer | Allocated signals | Note |
|---|---|---|
| 6 | Ground<br>Battery | |
| 7 | USB 3.0<br>MIPI<br>CAM MIPI<br>Battery | High-speed/large-capacity signal transmission<br>High frequency signal transmission for wireless communication |
| 8 | Ground<br>System power<br>Battery | |
| 9 | System power<br>Battery<br>IC control signal | |
| 10 | Charging line<br>System power<br>Battery<br>SIM power<br>IC control signal | |
| 11 | Charging line<br>System power | |
| 12 | Ground | Reinforcing plate |

Figure 9:
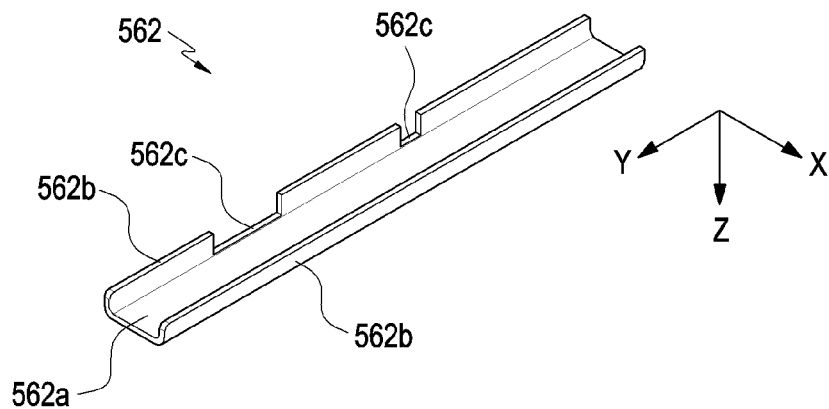
FIG. 9 is a perspective view illustrating a reinforcing plate in an electronic device according to an embodiment of the disclosure.

FIG. 9 is a first plan view illustrating a reinforcing plate (for example, the reinforcing plate 462d or 464d of FIG. 6 or FIG. 8) of an electronic device according to an embodiment of the disclosure.

Referring to FIGS. 6, 8 and 9, the electronic device 400 and/or each of the first circuit board 462 (for example, the first circuit board 162 of FIG. 3A) and the second circuit board 464 (for example, the second circuit board 164 of FIG. 3A) may further include the reinforcing plate 562 (for example, the reinforcing plate 462d or 464d of FIG. 6 or FIG. 8). The reinforcing plate 562 may be shaped in correspondence with at least the second arrangement area 462b of the first arrangement area 462a and the second arrangement area 462b, and may include a flat portion 562a and bent portions 562b. The flat portion 562a may be a part coupled to substantially face the circuit board 462 or 464, and the bent portions 562b may be parts bent from the flat portion 562a to at least partially surround side surfaces of the circuit board 462 or 464. In some embodiments, a plurality of bent portions 562b may be disposed on at least one side of the flat portion 562a, and an open area 562c may be formed between bent portions 562b. The open area 562c may be, for example, an area for accommodating a portion protruding from an edge of the circuit board 462 or 464.

According to various embodiments, the reinforcing plate 562 may be disposed to face the second arrangement area 462b (or the fourth arrangement area 464b) from the other surface of the first circuit board 462 or the second circuit board 464. According to one embodiment, the reinforcing plate 562 may be coupled with the first circuit board 462 (or the second circuit board 464) substantially in the second arrangement area 462b (or the fourth arrangement area 464b). For example, since the width (the length measured in the X-axis direction) of the second arrangement area 462b is small, the mechanical strength of the second arrangement area 462b may be weakened. Thus, the reinforcing plate 562 may be coupled with the second arrangement area 462b to supplement the mechanical strength of the first circuit board 462. In some embodiments, the reinforcing plate 562 may be formed of an electrically conductive material such as stainless using steel (SUS) and may function as a ground conductor of the first circuit board 462 (or the second circuit board 464).

According to various embodiments, rotation support surfaces (for example, the first rotation support surface 112 and the second rotation support surface 122 in FIG. 3A) may be curved in correspondence with the hinge cover 440, and the external size of the electronic device 400 (for example, the housings 110 and 120) may be determined by the rotation support surfaces 112 and 122. In the internal space of the electronic device 400, the first battery 169a and/or the second battery 169b may be manufactured in a substantially rectangular parallelepiped shape. For example, the external size or inner space shape (for example, inclined or curved surface) of the electronic device 400 and/or the housings 110 and 120 determined by the rotation support surfaces 112 and 122 may make a negligibly small contribution to increasing the capacity (for example, volume) of the first battery 169a and/or the second battery 169b. For example, a portion that does not contribute to securing the battery capacity (hereinafter referred to as an "unused space") may exist at a position adjacent to the hinge cover 140 in the internal space of the electronic device 400 (for example, the housings 110 and 120). According to an embodiment, the second arrangement area 462b and/or the fourth arrangement area 464b may be disposed in an inner space, for example, an unused space secured substantially by the rotation support surfaces (for example, the first rotation support surface 112 and the second rotation support surface 122 in FIG. 3A).

According to various embodiments, at the second position, each of the second arrangement area 462b and the fourth arrangement area 464b may be arranged in parallel to the other arrangement area on one side of the other arrangement area. For example, the connectors 462c of the second arrangement area 462b and the connectors 464c of the fourth arrangement area 464b may be arranged in parallel to each other on one side of each other, and reduce a wiring path that electrically couples the first circuit board 462 to the first circuit board 464. According to an embodiment, when the connectors 462c and 464c are arranged along the length direction (Y-axis direction) in the first arrangement area 462a and/or the third arrangement area 464a to reduce the wiring path, this arrangement may become an obstacle in extending the length of the first battery 169a and/or the second battery 169b (for example, the length in the Y-axis direction). For example, as the connectors 462c and/or 464c are disposed in the second arrangement area 462b and/or the fourth arrangement area 464b, it may be easy to increase the length (for example, capacity) of the first battery 169a and/or the second battery 169b. As described above, in an electronic device according to various embodiments of the disclosure (for example, the electronic devices 100 and 400 of FIGS. 1 to 4), one end portion of the FPCB 441 may be disposed in parallel on one side (for example, an unused space) of one of the batteries 169a and 169b, crossing the rotation axes P1 and P2 and thus connected to one of the circuit boards 462 and 464. For example, the arrangement of the wiring structure in the unused space may provide an environment in which the use efficiency of the internal space of the electronic device 100 or 400 and/or the housings 110 and 120 is increased, and the capacities of the batteries 169a are easily increased in the length direction (Y-axis direction). A correlation between the second arrangement area 462b and/or the fourth arrangement area 464b of the circuit board 462 and/or the circuit board 464 and the capacities of the batteries 169a and 169b will be described in greater detail with reference to FIG. 11.

Figure 10:
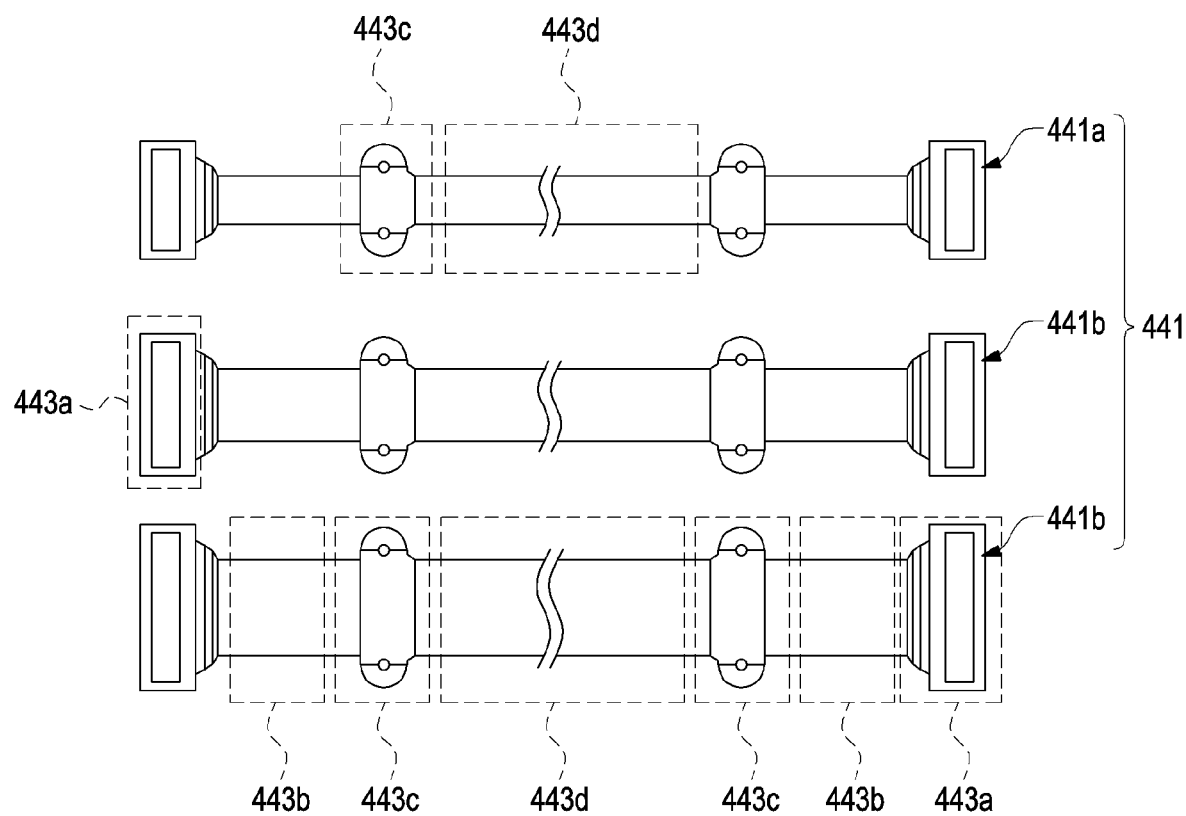
FIG. 10 is a diagram illustrating flexible printed circuit boards (FPCBs) in an electronic device according to an embodiment of the disclosure.

FIG. 10 is a diagram illustrating FPCBs in an electronic device (for example, the electronic devices 100 and 400 of FIGS. 1, 2, 3, and 4) according to an embodiment of the disclosure.

Referring to FIG. 10, the electronic device 400 may include a plurality of FPCBs 441. Among the FPCBs 441, the first FPCB 441a may be configured to transmit an analog signal such as a radio frequency signal for wireless communication. One end portion of the first FPCB 441a may be connected to the second arrangement area 462b (or the fourth arrangement area 464b) at a position adjacent to the first arrangement area 462a (or the third arrangement area 464a). Among the FPCBs 441, one or more second FPCB 441b may be provided. The second FPCB(s) 441b may be arranged together with the first FPCB 441a along the direction of the first rotation axis P1 or the second rotation axis P2, and have one end portion connected to the second arrangement area 462b (or the fourth arrangement area 464b). Similarly to the arrangement of the connectors 462c and 464c, one end portions (for example, connector portions 443a) of the FPCBs 441 may be arranged in a direction in which the second arrangement area 462b extends, for example, in the length direction (Y-axis direction) and/or the direction in which the rotation axes P1 and P2 extend.

According to various embodiments, one of the second FPCBs 441b is taken as an example. The FPCB 441 may include connector portions 443a at both end portions thereof, first bent portions 443b, fixed portions 443c, and/or a second bent portion 443d. Each of the connector portions 443a may provide a structure connected to one of the connectors 462c and 464c. For example, when the connectors 462c and 464c are male connectors, the connector portions 443a may be female connectors. The first bent portions 443b may extend from the connector portions 443a and may be disposed inclined (for example, perpendicularly) with respect to the connector portions 443a in the housings 110 and 120. In one embodiment, the fixed portions 443c may extend from the first bent portions 443b and may be disposed to be inclined (for example, perpendicularly) with respect to the first bent portion 443b to substantially face the connector portions 443a. In some embodiments, the fixed portions 443c may be disposed to face the connector portions 443a with some of the internal structures of the housings 110 and 120 in between. In another embodiment, the fixed portions 443c may be fixed to some of the internal structures of the housings 110 and 120. For example, each of the fixed portions 443c may be fixed to one of the first mid plate 152 and the second mid plate 154 of FIG. 3A. The second bent portion 443d is a portion extending between the two fixed portions 443c and may be disposed in the inner space of the hinge cover 140, in the shape of a generally curved line or curved surface. At the second position, for example, in the flat state of the electronic device, the second bent portion 443d may be shaped into a curved line or curved surface having an inflection point (a point at which a curvature radius changes from a negative value to a positive value or from a positive value to a negative value).

Figure 11:
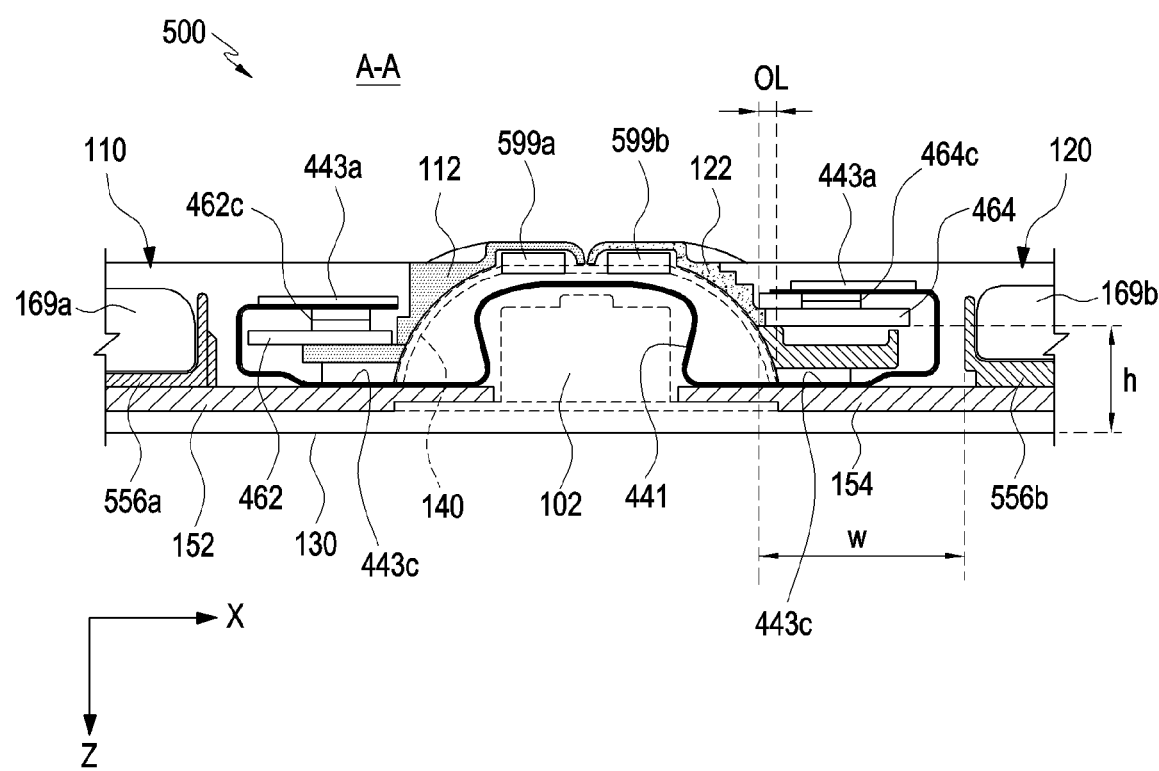
FIG. 11 is a sectional view illustrating a cut part of an electronic device according to an embodiment of the disclosure.

FIG. 11 is a sectional view illustrating a cut part of an electronic device (for example, the electronic devices 100 and 400 of FIGS. 1, 2, 3, and 4) according to an embodiment of the disclosure.

FIG. 11 is a diagram illustrating, for example, the section of the electronic device 400, taken along line A-A in FIG. 4. For components that may be easily understood from the foregoing embodiment, the same reference numerals as those in the foregoing embodiment or no reference numerals may be assigned, and their detailed description will be avoided herein.

Referring to FIG. 11 together with FIG. 10, an electronic device 500 may further include a first support member 556a and a second support member 556b. The first support member 556a may be disposed inside the first housing 110 and define a space in which the first battery 169a is accommodated. For example, the first support member 556a may be disposed between the first battery 169a and the first circuit board 462 (for example, the second arrangement area 462b in FIG. 5) to protect the battery 169a from mechanical interference. In one embodiment, the second support member 566b may be disposed inside the second housing 120 and may protect the second battery 169b from mechanical interference. In some embodiments, the first support member 556a may be a part of the first mid plate 152 and/or may be integrally formed with the first side member 111 of FIG. 3A. The second support member 556b may be a part of the second mid plate 154 and/or may be integrally formed with the second side member 121 of FIG. 3A.

According to various embodiments, the electronic device 500 may further include a first sealing member 599a disposed on the first rotation support surface 112 and a second sealing member 599b disposed on the second rotation support surface 122. The sealing members 599a and 599b may substantially come into close contact with the outer surface of the hinge cover 140. In one embodiment, the inner space of the electronic device 500 may be formed by a structure in which the hinge cover 140 and the housings 110 and 120 are combined. The housings 110 and 120 may be folded or unfolded by rotating with respect to each other and/or with respect to the hinge cover 140, and for smooth rotation, the hinge cover 140 and the housings 110 and 120 may be spaced from each other by a specified gap. In one embodiment, the sealing members 559a and 599b may be formed of a low-density elastic material (for example, sponge) so that the sealing members 559a and 599b seal the gap between the hinge cover 140 and the housings 110 and 120, while sliding in contact with the outer surface of the hinge cover 140. In some embodiments, the material of the sealing members 599a and 599b may be appropriately selected in consideration of sealing performance or smoothness of sliding contact.

According to various embodiments, one end portion (for example, a connector portion 443a of FIG. 10) of the FPCB 441 may be connected to the first circuit board 462 (for example, the second arrangement area 462b of FIG. 5) inside the first housing 110, and the other end portion of the FPCB 441 may be connected to the second circuit board 464 (for example, the fourth arrangement area 464b in FIG. 7) inside the second housing 120. The FPCB 441 may be disposed in the inner space of the hinge cover 140 through an area between the first battery 169a (or the second battery 169b) and the first circuit board 462 (or the second circuit board 464) and/or an area between the first circuit board 462 (or the second circuit board 464) and the flexible display 130. For example, as the FPCB 441 is disposed to partially surround the first circuit board 462 (or the second circuit board 464), at least a part (for example, a fixed portion 443c of FIG. 10) of the FPCB 441 may be disposed between one end portion (for example, a connector portion 443a of FIG. 10) of the FPCB 441 and the flexible display 130. According to one embodiment, the fixed portion 443c may overlap at least partially with the one end portion (for example, the connector portion 443a) of the FPCB 441 in a thickness direction (for example, the Z-axis direction) inside the first housing 110 or the second housing 120.

In some embodiments, each of the fixed portions 443c of FIG. 10 may be fixed to an internal structure (for example, the mid plates 152 or 154) of the housing 110 or 120, at least partially between the first circuit board 462 (or the second circuit board 464) and the flexible display 130. According to an embodiment, a part (for example, a first bent portion 443b in FIG. 10) of the FPCB 441 between the one end portion and the fixed portion 443c of the FPCB 441 may be disposed to face one side surface of the battery 169a or 169b or one side surface of the first circuit board 462 (or the second circuit board 464). In some embodiments, a part of each of the support members 556a and 556b may be disposed between the first bent portion 443b and one side surface of the battery 169a or 169b. While parts of the FPCB 441 aligned in the Z-axis direction, for example, the first bent portions 443b are illustrated in FIG. 11 as shaped into straight lines, various embodiments of the disclosure are not limited thereto. For example, the FPCB 441 may have a certain degree of elasticity, and when the connector portions 443a and the fixed portions 443c are fixed to face each other, the first bent portions 443b may be disposed in the shape of curved surfaces.

According to various embodiments, the curved shape of the rotation support surfaces 112 and 122 and/or the hinge cover 140 may be a cause of limiting the battery capacity relative to the internal space of the housings 110 and 120, as mentioned before. As illustrated in FIG. 11, in a structure in which the widths of the batteries 169a and 169b are secured to the maximum in the X-axis direction, an unused space that makes little contribution to the increase of the battery capacity (for example, the inner spaces of the housings 110 and 120 formed by the rotation support surfaces 112 and 122) may be substantially located between the batteries 169a and 169b and the hinge cover 140. In one embodiment, as the unused space is far from the flexible display 130 in the −Z direction, the unused space may extend in the +X direction in the first housing 110 and in the −X direction in the second housing 120. In one embodiment, the second arrangement area 462b (or the fourth arrangement area 464b) and the FPCB 441 may at least partially overlap with the rotation support surfaces 112 and 122 and/or the hinge cover 140, when viewed from the thickness direction of the housings 110 and 120 (for example, the Z-axis direction). In some embodiments, as the height h of the circuit boards 462 and 464 (for example, the second arrangement area 462b and the fourth arrangement area 464b) from the flexible display 130 increases, each of the arrangement areas 462b and 464b may overlap with one of the rotation support surfaces over an increased area or width OL, and the gap W between the support members 556a and 556b and/or the batteries 169a and 169b and the circuit boards 462 and 464 may increase. For example, when the circuit boards 462 and 464 (for example, the second arrangement area 462b and the fourth arrangement area 464b) are arranged close to the hinge module 102 within a range allowed by the inner space of the housings 110 and 120, at least a part of the gap w may be used as a space for substantially increasing the capacity of the batteries 169a and 169b. While in the illustrated embodiment, the second arrangement area 462b (or the fourth arrangement area 464b) and the FPCB 441 overlap at least partially with the rotation support surface 112 or 122 and/or the hinge cover 140, when viewed from the thickness direction of the housings 110 and 120 (for example, in the Z-axis direction), the disclosure is not limited thereto. For example, when the thickness of the structure forming the rotation support surfaces 112 and 122 increases, it may be more difficult to secure a height enough to accommodate the second arrangement area 462b (or the fourth arrangement area 464b) and/or the connector portions 443a of the FPCB 441, for example, the height of the unused space in the Z-axis direction. In this case, the second arrangement area 462b (or the fourth arrangement area 464b) and the FPCB 441 may not overlap with the rotation support surface 112 or 122 and/or the hinge cover 140 in the thickness direction. In another embodiment, the second arrangement area 462b (or the fourth arrangement area 464b) and the FPCB 441 may overlap with the rotation support surface 112 or 122 in the thickness direction, not with the hinge cover 140.

As described above, in an electronic device (for example, the electronic devices 100 and 400 of FIGS. 1, 2, 3, and 4 and/or the electronic device 500 of FIG. 11) according to various embodiments of the disclosure, a wiring structure (for example, the arrangement areas 462b and 464b of FIG. 5 or FIG. 7 and/or the FPCBs 441 of FIG. 10) is disposed by using an area which makes little contribution to securing the capacity of the batteries 169a and 169b in a structure in which at least a pair of housings 110 and 120 are rotatably coupled with each other. Therefore, design freedom regarding the arrangement of electric/electronic components in the remaining areas may be increased. In another embodiment, an extra free space secured by arranging the wiring structure in the unused space may be used to secure the battery capacity or contribute to miniaturization of the circuit boards and/or the housings.

As described with reference to FIG. 11, it may be easily understood that as a circuit board (for example, the circuit boards 462 and 464 of FIGS. 5, 6, 7, and 8), for example, the second arrangement area 462b (or the fourth arrangement area 464b) has a smaller thickness or width, it is easier to arrange the wiring structure even in a narrower unused space. In one embodiment, since the reinforcing plate of FIGS. 6, 8 and/or 9 may increase the thickness or width of the second arrangement area, the reinforcing plate may contribute to the increase of the stiffness or strength of the circuit boards 462 and 464. However, the reinforcing plate may limit the use of the unused space. A structure for further improving the usability of an unused space will be described with further reference to FIG. 12.

Figure 12:
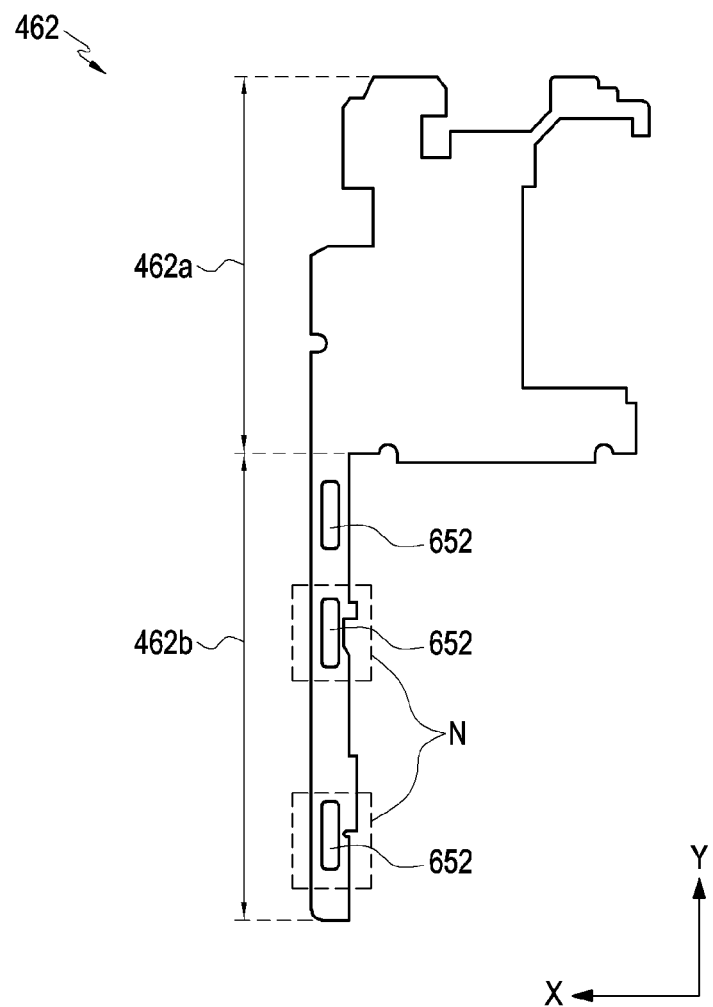
FIG. 12 is a diagram illustrating a modification example of circuit board(s) or a reinforcing plate in an electronic device according to an embodiment of the disclosure.

FIG. 12 is a diagram illustrating a modification example of circuit board(s) (for example, the circuit boards 462 and 464 in FIGS. 5, 6, 7, and 8) or a reinforcing plate 652 (for example, the reinforcing plate 462d or 464d in FIG. 6 or FIG. 8) in an electronic device (for example, the electronic devices 100 and 400 of FIGS. 1, 2, 3, and 4, or the electronic device 500 of FIG. 11) according to an embodiment of the disclosure.

Referring to FIG. 12, an electronic device (for example, the electronic devices 100 and 400 of FIGS. 1, 2, 3, and 4, or the electronic device 500 of FIG. 11) may include at least one reinforcing plate disposed on the other surface of the second arrangement area 462b of the first circuit board 462 (or the fourth arrangement area 464b of the circuit board 464). Compared to the reinforcing plate 562 of FIG. 9 which substantially covers the entire second arrangement area 462b, the reinforcing plate 652 of FIG. 12 may be disposed on a part of the second arrangement area 462b. For example, a part (for example, a part denoted by "N") of the second arrangement area 462b may have a narrower width than the other parts thereof due to the internal structure or shape of a first housing or a second housing (for example, the housings 110 and 120 of FIGS. 1, 2, and 3A). The electronic device 100, 400, or 500 may include the reinforcing plate 652 disposed on the other surface of the first circuit board 462 (or the second circuit board 464) in the narrow part denoted by "N", thereby increasing the strength of at least the narrow part of the second arrangement area 462b.

According to various embodiments, a plurality of reinforcing plates 652 may be provided, and at least one of the reinforcing plates 652 may be disposed at a position corresponding to one of the connectors 462c and 464c. For example, the reinforcing plates 652 may be disposed on narrow parts of the second arrangement area 462b or in correspondence with the connectors 462c and 464c to improve the strength of the circuit boards 462 and 464. In one embodiment, a passive element and/or an IC chip (not shown) may be disposed on the other surface of the second arrangement area 462b or the fourth arrangement area 464b, and the reinforcing plate(s) 652 may be disposed without overlapping with the passive device and/or the IC chip on the other surface of the second arrangement area 462b or the fourth arrangement area 464b.

According to various embodiments, the reinforcing plate(s) 652 may have a thickness smaller than a height to which the passive element or the IC circuit chip protrudes from the other surface of the second arrangement area 462b or the fourth arrangement area 464b. In another embodiment, the reinforcing plate(s) 652 may be positioned substantially in the second arrangement area 462b or the fourth arrangement area 464b in the width direction (for example, the X-axis direction). For example, the arrangement of the reinforcing plate(s) 652 may not affect the space required to accommodate the second arrangement area 462b or the fourth arrangement area 464b inside the housings 110 and 102. Accordingly, the arrangement of the reinforcing plate(s) 652 may improve the strength of the circuit boards 462 and 464 without requiring an additional accommodation space. In one embodiment, the shape or size of the reinforcing plate(s) 652 may be appropriately designed in consideration of the shape of an area or space in which the reinforcing plate(s) 652 is actually disposed. In some embodiments, the reinforcing plate(s) 652 may be formed of an electrically conductive material, for example, SUS, and when formed of an electrically conductive material, the reinforcing plate(s) 652 may function as the ground of the electronic devices 100, 400, and 500 and/or the circuit boards 462 and 464.

As described above, according to various embodiments of the disclosure, an electronic device (for example, the electronic devices 100 and 400 in FIGS. 1, 2, 3, and 4 and/or the electronic device 500 in FIG. 11) may comprise a first housing (for example, the first housing 110 in FIGS. 1, 2, 3, and 4 or FIG. 11), a second housing (for example, the second housing 120 in FIGS. 1, 2, 3, and 4 or FIG. 11), a hinge area (for example, an area or a space formed between the first housing 120 and the second housing 120 in FIGS. 1 and 3, and at least partially disposed in a position corresponding to a folding area 133 of the flexible display 130 in an unfolded position) disposed between the first housing and the second housing, at least one hinge module (for example, the hinge structure or hinge module 102 in FIG. 3A and/or FIG. 11) provided at the hinge area, the at least one hinge module coupled to the first housing and the second housing and configured to allow rotation of the first housing and the second housing with respect to each other between a folded position (for example, the state illustrated in FIG. 2) and a unfolded position (for example, the state illustrated in FIG. 1), a first battery (for example, one of the batteries 169a and 169b in FIG. 3A, FIG. 4, or FIG. 11) provided in the first housing, a first circuit board (for example, the first circuit board 162 or 462 in FIGS. 3A, 3B, 4, and 5 or FIG. 11 or the second circuit board 164 or 464 in FIGS. 3A, 4, and 7 or FIG. 11) provided in the first housing, the first circuit board includes a first portion (for example, the second or fourth arrangement area 462b or 464b in FIG. 5 or FIG. 7) disposed between the first battery and the hinge area, and at least one flexible printed circuit board (FPCB) (for example, the FPCB 441 in FIG. 4, FIG. 10, or FIG. 11) extending from an interior of the first housing to an interior of the second housing, wherein a portion of the at least one FPCB is disposed between the first battery and the first portion of the first circuit board.

According to various embodiments of the disclosure, an electronic device (for example, the electronic devices 100 and 400 in FIGS. 1, 2, 3, and 4 and/or the electronic device 500 in FIG. 11) may include at least one hinge module (for example, the hinge structure or hinge module 102 in FIG. 3A and/or FIG. 11) providing at least one folding axis (for example, at least one of the rotation axis A1 or the rotation axis A2 in FIG. 3A or FIG. 4), a first housing (for example, the first housing 110 in FIGS. 1, 2, 3, and 4 or FIG. 11) coupled with the hinge module to rotate around the folding axis, a second housing (for example, the second housing 120 in FIGS. 1, 2, 3, and 4 or FIG. 11) coupled with the hinge module to rotate around the folding axis, and rotating with respect to the first housing, between a first position (for example, the state illustrated in FIG. 2) at which the second housing is folded, facing the first housing and a second position (for example, the state illustrated in FIG. 1) at which the second housing is unfolded at a specified angle from the first position, a first battery (for example, one of the batteries 169a and 169b in FIG. 3A, FIG. 4, or FIG. 11) provided in the first housing, a first circuit board (for example, the first circuit board 162 or 462 in FIGS. 3A, 3B, 4, and 5 or FIG. 11 or the second circuit board 164 or 464 in FIGS. 3A, 4, and 7 or FIG. 11) including a first arrangement area (for example, the first or third arrangement area 462a or 464a in FIG. 5 or FIG. 7) disposed in parallel to the first battery at least partially along a direction parallel to the folding axis, and a second arrangement area (for example, the second or fourth arrangement area 462b or 464b in FIG. 5 or FIG. 7) extending from the first arrangement area and disposed between the folding axis and the battery, and at least one FPCB (for example, the FPCB 441 in FIG. 4, FIG. 10, or FIG. 11) extending from the interior of the first housing to the interior of the second housing across the folding axis. Inside the first housing, one end portion of the FPCB may be connected to the second arrangement area, between the folding axis and the first battery, and a part of the FPCB may be disposed between the first battery and the second arrangement area.

According to various embodiments, the FPCB may include a connector portion (for example, a connector portion 443a in FIG. 10) connected to the second arrangement area, a first bent portion (for example, a first bent portion 443b in FIG. 10) extending from the connector portion and disposed between the first battery and the second arrangement area, and a fixed portion (for example, fixed portion 443c in FIG. 10) extending from the first bent portion and disposed to face the connector portion with a part of the second arrangement area in between.

According to various embodiments, the electronic device may further include a flexible display (for example, the flexible display 130 in FIG. 3A or FIG. 11) disposed from one surface of the first housing to one surface of the second housing across an area in which the hinge module is disposed, and the fixed portion may be disposed at least partially between the connector portion and the flexible display.

According to various embodiments, the fixed portion may be fixed inside the first housing (for example, to the first mid plate 152 in FIG. 3 or FIG. 11), between the second arrangement area and the flexible display.

According to various embodiments, the electronic device may include a flexible display disposed from one surface of the first housing to one surface of the second housing across an area in which the hinge module is disposed, and a hinge cover (for example, the hinge cover 140 in FIG. 3A, FIG. 4, or FIG. 11) disposed between the first housing and the second housing and accommodating at least a part of the hinge module. The FPCB may include a connector portion connected to the second arrangement area, a first bent portion extending from the connector portion and disposed between the first battery and the second arrangement area, a fixed portion extending from the first bent portion and disposed at least partially between the second arrangement area and the flexible display, a second bent portion (for example, the second bent portion 443d in FIG. 10) extending from the fixed portion and disposed inside the hinge cover, and another fixed portion extending from the second bent portion and disposed inside the second housing.

According to various embodiments, the FPCB may further include another first bent portion extending from the other fixed portion and disposed inside the second housing, and another connector portion extending from the other first bent portion and disposed inside the second housing. The other fixed portion may be disposed at least partially between the other connector portion and the flexible display.

According to various embodiments, the second arrangement area may extend from one edge of the first arrangement area along a direction of the folding axis and may be disposed on one side of the first battery.

According to various embodiments, the electronic device may further include a hinge cover disposed between the first housing and the second housing and accommodating at least a part of the hinge module. The hinge cover may be exposed between the first housing and the second housing at the first position, and may be at least partially hidden by the first housing and the second housing at the second position.

According to various embodiments, when view through along a thickness direction of the first housing or the second housing at the second position, one end portion of the FPCB may overlap at least partially with the hinge cover (for example, see FIG. 11).

According to various embodiments, at the second position, one end portion of the FPCB may be located in a space between the first battery and the hinge cover (for example, see FIG. 11).

According to various embodiments, the electronic device may further include a second circuit board accommodated in the second housing, and the FPCB may electrically couple the first circuit board and the second circuit board to each other.

According to various embodiments, the electronic device may further include a second battery disposed adjacent to the second circuit board inside the second housing, and the other end portion of the FPCB may be connected to the second circuit board, between the second battery and the folding axis.

According to various embodiments, the second circuit board may include a third arrangement area disposed in parallel to the second battery along the direction parallel to the folding axis, and a fourth arrangement area extending from the third arrangement area along a direction of the folding axis and disposed between the folding axis and the second battery. The other end portion of the FPCB may be connected to the fourth arrangement area.

According to various embodiments, the electronic device may further include at least one reinforcing plate (for example, the reinforcing plate 462d or 464d in FIG. 6 or FIG. 8) disposed in at least one of the second arrangement area or the fourth arrangement area.

According to various embodiments, the electronic device may further include at least one reinforcing plate disposed on one surface of at least one of the second arrangement area or the fourth arrangement area, and the FPCB may be connected to the first circuit board and the second circuit board from the other surface of the second arrangement area and the other surface of the fourth arrangement area, respectively.

According to various embodiments, the electronic device may include a plurality of FPCBs arranged along a direction of the folding axis.

According to various embodiments of the disclosure, a portable communication device (for example, the electronic devices 100 and 400 in FIGS. 1, 2, 3, and 4 and/or the electronic device 500 in FIG. 11) may include a housing foldable with respect to a folding axis (for example, at least one of the first rotation axis A1 in FIG. 3A or FIG. 4 or the second rotation axis A2 in FIG. 3A or FIG. 4) and including a first housing part (for example, the first housing 110 in FIGS. 1, 2, 3, and 4 or FIG. 11), a second housing part (for example, the second housing 120 in FIGS. 1, 2, 3, and 4 or FIG. 11), and a hinge cover (for example, the hinge cover 140 in FIG. 3A, FIG. 4, or FIG. 11) located between at least a part of the first housing part and at least a part of the second housing part, the first housing part including a first sidewall part extending in parallel to the folding axis (for example, a sidewall part of the first housing 110 extending in parallel to the Y axis and remote from the first rotation axis A1 in FIG. 3A), a second sidewall part extending from a first end of the first sidewall part, perpendicularly to the folding axis (for example, a sidewall part being one of two sidewall parts of the first housing 110 extending in parallel to the X axis and closer to the +Y axis than the other in FIG. 3A), and a third sidewall part extending from a second end of the first sidewall part, perpendicularly to the folding axis (for example, a sidewall part being the other of the two sidewall parts of the first housing 110 extending in parallel to the X axis and closer to the −Y axis than the one sidewall part in FIG. 3A), a hinge module (for example, the hinge structure or hinge module 102 in FIG. 3A and/or FIG. 11) accommodated in the housing and connected to the first housing part and the second housing part, a flexible display (for example, the flexible display 130 in FIG. 3A or FIG. 11) accommodated in the first housing part and the second housing part, a battery (for example, one of the batteries 169a and 169b in FIG. 3A, FIG. 4, or FIG. 11) accommodated in the first housing part and having a first side surface directed toward the second sidewall part and spaced from the second sidewall part by a first distance and a second side surface directed toward the hinge cover and spaced from the hinge cover by a second distance smaller than the first distance, a first rigid printed circuit board (RPCB) (for example, the first circuit board 162 in FIG. 3A) accommodated in the first housing part and including a first part (for example, the first or third arrangement area 462a or 464a in FIG. 5 or FIG. 7) located between the first side surface of the battery and the second sidewall part and a second part (for example, the second or fourth arrangement area 462b or 464b in FIG. 5 or FIG. 7) extending from the first part and located between the second side surface of the battery and the hinge cover, the second part including a first surface directed toward the flexible display, a second surface directed in a direction opposite to the first surface of the second part, and a first connector (for example, the connector(s) 462c in FIG. 5) located on the second surface of the second part, a second RPCB (for example, the second circuit board 164 in FIG. 3A) accommodated in the second housing part and including a third part (for example, the fourth arrangement area 464b in FIG. 7) opposing the second part of the first RPCB in a folded state of the housing, the third part including a first surface directed toward the flexible display, a second surface directed in a direction opposite to the first surface of the third part, and a second connector (for example, the connector(s) 464c in FIG. 7) located the second surface of the third part, and an FPCB (for example, the FPCB 441 in FIG. 4, FIG. 10, or FIG. 11) at least partially disposed between the hinge cover and the flexible display and connected to the first connector of the first RPCB and the second connector of the second RPCB. The FPCB may extend in a first direction (for example, the −X-axis direction from the hinge cover 140 in FIG. 11) to surround the second surface of the second part of the first RPCB, a side surface between the first surface and the second surface of the second part, and a part of the first surface of the second part, and is connected to the first connector. The FPCB may also extend in a second direction (for example, the +X-axis direction from the hinge cover 140 in FIG. 11) opposite to the first direction, and is connected to the second connector.

According to various embodiments, the portable communication device may further include a support member (for example, the first mid plate 152 in FIG. 3 or FIG. 11) accommodated between the FPCB and the first housing part and fixing a part (for example, a fixed portion 443c in FIG. 10) of the FPCB.

According to various embodiments, when viewed from a direction substantially perpendicular to the first RPCB, the part of the FPCB may overlap at least partially with the first connector.

According to various embodiments, at least a part of a part (for example, a first bent portion 443b in FIG. 10) of the FPCB surrounding the side surface of the second part of the first RPCB may be spaced from the side surface of the second part of the first RPCB and form a curved surface.

According to various embodiments, the portable communication device may include an application processor (for example, an electric/electronic component disposed or included in the circuit board 462 or 464 in FIG. 4) located in the first part of the first RPCB and electrically coupled to the first connector.

According to various embodiments, the portable communication device may further include at least one other FPCB located between the hinge cover and the flexible display. The first RPCB may include at least one third connector located on the second surface of the second part, and the second RPCB may include at least one fourth connector located on the second surface of the third part. The other FPCB may extend in the first direction to surround the first surface of the second part of the first RPCB, the side surface of the second part, and a part of the second surface of the second part, and may be connected to the third connector. The other FPCB may also extend in the second direction to surround the first surface of the third part of the second RPCB, the side surface of the third part, and a part of the second surface of the third part, and may be connected to the fourth connector.

According to various embodiments, the portable communication device may further include another display (for example, the sub-display visually exposed outward through one of the rear covers 180 and 190 in FIG. 2) accommodated in the second housing part. The flexible display may be located not to be visually exposed outward from the portable communication device, when the housing is folded, and the other display may be located to be visually exposed outward from the portable communication device, regardless of whether the housing is folded.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
   a first housing;
   a second housing;
   a hinge area disposed between the first housing and the second housing;
   at least one hinge module provided at the hinge area, the at least one hinge module coupled to the first housing and the second housing and configured to allow rotation of the first housing and the second housing with respect to each other between a folded position and a unfolded position;
   a first battery provided in the first housing;
   a first circuit board provided in the first housing, the first circuit board includes a first portion disposed between the first battery and the hinge area; and
   at least one flexible printed circuit board (FPCB) extending from an interior of the first housing to an interior of the second housing,
   wherein a portion of the at least one FPCB is disposed between the first battery and the first portion of the first circuit board.

2. The electronic device of claim 1, wherein the at least one FPCB comprises:
   a connector portion connected to the first portion;
   a first bent portion extending from the connector portion and disposed between the first battery and the first portion; and
   a fixed portion extending from the first bent portion and disposed to face the connector portion with a part of the first portion in between.

3. The electronic device of claim 2, further comprising:
   a flexible display disposed from one surface of the first housing to one surface of the second housing across the hinge area,
   wherein the fixed portion is disposed at least partially between the connector portion and the flexible display.

4. The electronic device of claim 3, wherein the fixed portion is fixed inside the first housing, between the first portion and the flexible display.

5. The electronic device of claim 1, further comprising:
   a flexible display disposed from one surface of the first housing to one surface of the second housing across the hinge area; and
   a hinge cover disposed between the first housing and the second housing and accommodating at least a part of the at least one hinge module,
   wherein the at least one FPCB comprises:
      a connector portion connected to the first portion,
      a first bent portion extending from the connector portion and disposed between the first battery and the first portion,
      a fixed portion extending from the first bent portion and disposed at least partially between the first portion and the flexible display,
      a second bent portion extending from the fixed portion and disposed inside the hinge cover, and
      another fixed portion extending from the second bent portion and disposed inside the second housing.

6. The electronic device of claim 5,
   wherein the at least one FPCB further comprises:
      another first bent portion extending from the other fixed portion and disposed inside the second housing, and
      another connector portion extending from the other first bent portion and disposed inside the second housing, and
   wherein the other fixed portion is disposed at least partially between the other connector portion and the flexible display.

7. The electronic device of claim 1, wherein the first circuit board further includes a second portion disposed in parallel to the first battery, and the first portion extends from one edge of the second portion and disposed on one side of the first battery.

8. The electronic device of claim 1, further comprising:
   a hinge cover disposed between the first housing and the second housing and accommodating at least a part of the at least one hinge module,
   wherein the hinge cover is exposed between the first housing and the second housing at the folded position, and at least partially hidden by the first housing and the second housing at the unfolded position.

9. The electronic device of claim 8, wherein when viewed through along a thickness direction of the first housing or the second housing at the unfolded position, one end portion of the at least one FPCB overlaps at least partially with the hinge cover.

10. The electronic device of claim 8, wherein at the unfolded position, the one end portion of the at least one FPCB is located in a space between the first battery and the hinge cover.

11. The electronic device of claim 1, further comprising:
    a second circuit board accommodated in the second housing,
    wherein the at least one FPCB electrically couples the first circuit board and the second circuit board to each other.

12. The electronic device of claim 11, further comprising:
    a second battery disposed adjacent to the second circuit board inside the second housing,
    wherein another end portion of the at least one FPCB is connected to the second circuit board, between the second battery and the hinge area.

13. The electronic device of claim 12,
    wherein the second circuit board comprises:
       a third portion disposed in parallel to the second battery; and
       a fourth portion extending from the third portion and disposed between the hinge area and the second battery, and
    wherein the other end portion of the at least one FPCB is connected to the fourth portion.

14. The electronic device of claim 13, further comprising at least one reinforcing plate disposed in at least one of the first portion or the fourth portion.

15. The electronic device of claim 13, further comprising:
    at least one reinforcing plate disposed on one surface of at least one of the first portion or the fourth portion,
    wherein the at least one FPCB is connected to the first circuit board and the second circuit board from the other surface of the first portion and the other surface of the fourth portion, respectively.

16. The electronic device of claim 1, wherein the at least one hinge module is configured to provide at least one folding axis around which the first housing and the second housing rotate, and wherein a plurality of FPCBs are arranged along a direction of the at least one folding axis.

17. A portable communication device comprising:
a housing foldable with respect to a folding axis and including a first housing portion, a second housing portion, and a hinge cover located between at least a part of the first housing portion and at least a part of the second housing portion, the first housing portion including a first sidewall portion extended in parallel to the folding axis, a second sidewall portion extended from a first end of the first sidewall portion, perpendicularly to the folding axis, and a third sidewall portion extended from a second end of the first sidewall portion, perpendicularly to the folding axis;
a hinge module accommodated in the housing and connected to the first housing portion and the second housing portion;
a flexible display accommodated in the first housing portion and the second housing portion;
a battery accommodated in the first housing portion and having a first side surface directed toward the second sidewall portion and spaced from the second sidewall portion by a first distance and a second side surface directed toward the hinge cover and spaced from the hinge cover by a second distance smaller than the first distance;
a first rigid printed circuit board (RPCB) accommodated in the first housing portion and including a first part located between the first side surface of the battery and the second sidewall portion and a second part extended from the first part and located between the second side surface of the battery and the hinge cover, the second part including a first surface directed toward the flexible display, a second surface directed in a direction opposite to the first surface of the second part, and a first connector located on the second surface of the second part;
a second RPCB accommodated in the second housing portion and including a third part at least partially facing with the second part of the first RPCB in a folded state of the housing, the third part including a first surface directed toward the flexible display, a second surface directed in a direction opposite to the first surface of the third part, and a second connector located on the second surface of the third part; and
a flexible printed circuit board (FPCB) at least partially disposed between the hinge cover and the flexible display, and connected to the first connector of the first RPCB and the second connector of the second RPCB,
wherein the FPCB is extended in a first direction to surround the second surface of the second part of the first RPCB, a side surface between the first surface and the second surface of the second part, and a part of the first surface of the second part, and is connected to the first connector, and
wherein the FPCB is extended in a second direction opposite to the first direction, and is connected to the second connector.

18. The portable communication device of claim 17, further comprising a support member disposed between the FPCB and the first housing portion and fixed with a part of the FPCB.

19. The portable communication device of claim 18, wherein when viewed in a direction substantially perpendicular to the first RPCB, the part of the FPCB is at least partially overlapped at least partially with the first connector.

20. The portable communication device of claim 17, wherein at least a part of the FPCB surrounding the side surface of the second part of the first RPCB is spaced from the side surface of the second part of the first RPCB and forms a curved surface.

21. The portable communication device of claim 17, further comprising an application processor located in the first part of the first RPCB and electrically coupled to the first connector.

22. The portable communication device of claim 17, further comprising:
another FPCB disposed between the hinge cover and the flexible display,
wherein the first RPCB includes a third connector located on the second surface of the second part, and the second RPCB includes a fourth connector located on the second surface of the third part,
wherein the other FPCB is extended in the first direction to surround the first surface of the second part of the first RPCB, the side surface of the second part, and a part of the second surface of the second part, and is connected to the third connector, and
wherein the other FPCB is extended in the second direction to surround the first surface of the third part of the second RPCB, the side surface of the third part, and a part of the second surface of the third part, and is connected to the fourth connector.

23. The portable communication device of claim 17, further comprising:
another display accommodated in the second housing portion,
wherein the flexible display is disposed not to be visually exposed outward from the portable communication device, when the housing is folded, and
wherein the other display is disposed to be visually exposed outward from the portable communication device, regardless of whether the housing is folded.

24. The portable communication device of claim 17, wherein the hinge module includes:
a hinge bracket;
a plurality of rotation pins including a first rotation pin and a second rotation pin; and
a plurality of hinge arms including a first hinge arm rotatably connected with the hinge bracket by the first rotation pin and a second hinge arm rotatably connected with the hinge bracket by the second rotation pin.

25. The portable communication device of claim 24, wherein the first hinge arm is connected with a mid-plate of the first housing portion and the second hinge arm is connected with a mid-plate of the second housing portion.

* * * * *